US007859944B2

(12) United States Patent  (10) Patent No.: US 7,859,944 B2
Zhou et al.  (45) Date of Patent: Dec. 28, 2010

(54) APPARATUS, SYSTEMS AND METHODS FOR ENHANCED MULTI-CARRIER BASED UNDERWATER ACOUSTIC COMMUNICATIONS

(75) Inventors: Shengli Zhou, Mansfield, CT (US);
Baosheng Li, Willington, CT (US);
Peter Willett, Coventry, CT (US);
Milica Stojanovic, Boston, MA (US);
Lee Freitag, Falmouth, MA (US)

(73) Assignees: Massachusetts Institute of Technology, Cambridge, MA (US); University of Connecticut, Farmington, CT (US); Woods Hole Oceanographic Institution, Woods Hole, MA (US)

( * ) Notice: Subject to any disclaimer, the term of this patent is extended or adjusted under 35 U.S.C. 154(b) by 238 days.

(21) Appl. No.: 12/141,527

(22) Filed: Jun. 18, 2008

(65) Prior Publication Data

US 2009/0129204 A1  May 21, 2009

Related U.S. Application Data

(60) Provisional application No. 60/936,167, filed on Jun. 18, 2007.

(51) Int. Cl.
*H04B 11/00* (2006.01)
(52) U.S. Cl. ..................................... 367/134
(58) Field of Classification Search ................... 367/134
See application file for complete search history.

(56) References Cited

U.S. PATENT DOCUMENTS 5,559,757 A  9/1996  Catipovic et al.
6,130,859 A *  10/2000  Sonnenschein et al. ..... 367/134
6,442,104 B1  8/2002  Ridgell, Jr. et al.
6,594,320 B1  7/2003  Sayeed
2006/0146948 A1  7/2006  Park et al.

FOREIGN PATENT DOCUMENTS

WO  95/16312  6/1995

OTHER PUBLICATIONS

International Search Report dated Jan. 6, 2009 (2 pages).
M. Stojanovic, "Recent Advances in High-Speed Underwater Acoustic Communications," IEEE Journal of Oceanic Engineering, vol. 121, No. 2, pp. 125-136, Apr. 1996.
D. B. Kilfoyle, et al., "The State of the Art in Underwater Acoustic Telemetry," IEEE Journal of Oceanic Engineering, vol. 25, No. 1, pp. 4-27, Jan. 2000.

(Continued)

*Primary Examiner*—Ian J Lobo
(74) *Attorney, Agent, or Firm*—McCarter & English, LLP

(57) ABSTRACT

Advantageous OFDM-based underwater acoustic (UWA) apparatus, systems and methods are provided according to the present disclosure. In general, OFDM transmissions over UWA channels encounter frequency-dependent Doppler drifts that destroy the orthogonality among OFDM subcarriers. The disclosed apparatus, systems, and methods use a two-step approach to mitigate frequency-dependent Doppler drifts for zero-padded OFDM transmissions over fast-varying channels: (1) non-uniform Doppler compensation via resampling to convert a "wideband" problem into a "narrowband" problem; and (2) high-resolution uniform compensation on the residual Doppler. The disclosed apparatus, systems and methods are based on block-by-block processing and do not rely on channel dependence across OFDM blocks. Thus, the disclosed apparatus, systems and methods are advantageously applicable for fast-varying UWA channels.

27 Claims, 20 Drawing Sheets

(a) Single Channel Receiver Processing (b) Multiple Channel Receiver Processing

OTHER PUBLICATIONS

D. J. Garrood, "Applications of the MFSK Acoustical Communication System," in Proc. Of OCEANS, Boston, MA, 1981.

Baggeroer et al., "DATS—A Digital Acoustic Telemetry System for Underwater Communications," in Proc. of OCEANS, Boston, MA, 1981.

M. Stojanovic et al., "Adaptive Multichannel Combining and Equalization for Underwater Acoustic Communications," Journal of the Acoustical Society of America, vol. 94, No. 3, pp. 1621-1631, 1993.

Stojanovic et al., "Phase-Coherent Digital Communications for Underwater Acoustic Channels," IEEE Journal of Oceanic Engineering, vol. 19, No. 1, pp. 100-111, Jan. 1994.

A. Doufexi, et al., "A Comparison of the HIPERLAN/2 and IEEE 802.11a Wireless LAN Standards," IEEE Communications Magazine, vol. 40, No. 5, pp. 172-180, May 2002.

IEEE Standard 802.16 Working Group, IEEE standard for local and metropolitan area networks part 16: air interface for fixed broadband wireless access systems, 2002.(Summary sheet; 1 page).

S. Coatelan, et al., "Design and Test of a Coded OFDM System on the Shallow Water Acoustic Channel," in Proc. of OCEANS, Sep. 1994.

B. Kim, et al., "Sea Trial Results of a Robust and Spectral-Efficient OFDM Underwater Communication System (Abstract)," The Journal of the Acoustical Society of America, vol. 109, No. 5, p. 2477, May 1, 2001.

R. Bradbeer, et al., "Using Multi-Frequency Modulation in a Modem for the Transmission of Near-Realtime Video in an Underwater Environment," in Proc. of IEEE International Conference on Consumer Electronics, Jun. 2003.

E. Bejjani, et al., "Multicarrier Coherent Communications for the Underwater Acoustic Channel," in Proc. of OCEANS, 1996.

W. K. Lam, et al., "A Coherent COFDM Modulation System for a Time-Varying Frequency-Selective Underwater Acoustic Channel," in Proc. of the 7th International Conference on Electronic Engineering in Oceanography, Jun. 1997, pp. 198-203.

W. K. Lam, et al., "A Frequency Domain Adaptive Coded Decision Feedback Equalizer for a Broadband UWA COFDM System," in Proc. of OCEANS, 1998.

Y. V. Zakharov, et al., "Multipath-Doppler Diversity of OFDM Signals in an Underwater Acoustic Channel," in IEEE International Conference on Acoustics, Speech, and Signal Processing, vol. 5, Jun. 2000, pp. 2941-2944.

S. Coatelan, et al., "Design and test of a coded OFDM system on the shallow water acoustic channel," in Proc. of OCEANS, Sep. 1994.

B. Kim, et al., "Sea Trial Results of a Robust and Spectral-Efficient OFDM Underwater Communication System (Abstract)," The Journal of the Acoustical Society of America, vol. 109, No. 5, pp. 2477 et seq., May 1, 2001.

R. Bradbeer, et al., "Using Multi-Frequency Modulation in a Modem for the Transmission of Near-Realtime Video in an Underwater Environment," in Proc. of IEEE International Conference on Consumer Electronics, Jun. 2003.

P. J. Gendron, "Orthogonal Frequency Division Multiplexing With On-Off-Keying: Noncoherent Performance Bounds, Receiver Design and Experimental Results," U.S. Navy Journal of Underwater Acoustics, vol. 56, No. 2, pp. 267-300, Apr. 2006; documentation limited to the U.S. Government (not obtainable).

M. Stojanovic, "Low complexity OFDM detector for underwater channels," in Proc. of MTS/IEEE OCEANS conference, Boston, MA, Sep. 18-21, 2006.

B. Li, et al., "Pilot-Tone Based ZP-OFDM Demodulation for an Underwater Acoustic Channel," in Proc. Of MTS/IEEE OCEANS conference, Boston, MA, Sep. 18-21, 2006.

L. Freitag, et al., "The WHOI Micro-Modem: An Acoustic Communications and Navigation System for Multiple Platforms," in Proceeding of OCEANS, Washington DC, 2005.

M. Stojanovic, "Recent Advances in High-Speed Underwater Acoustic Communications," IEEE Journal of Oceanic Engineering, vol. 121, No. 2, pp. 125-136, Apr. 1996.

D. B. Kilfoylem, et al., "The State of the Art in Underwater Acoustic Telemetry," IEEE Journal of Oceanic Engineering, vol. 25, No. 1, pp. 4-27, Jan. 2000.

Z. Wang, et al., "Wireless Multicarrier Communications: Where Fourier Meets Shannon," IEEE Signal Processing Magazine, vol. 17, No. 3, pp. 29-48, May 2000.

B. Muquet, et al., "Cyclic Prefix or Zero-Padding for Multi-Carrier Transmissions?" IEEE Transactions on Communications, vol. 50, No. 12, pp. 2136-2148, Dec. 2002.

D. MacKay, "Information Theory, Inference, and Learning Algorithms," Chapter 50, Cambridge University Press, 2003.

U. Tureli, et al., "A High-Efficiency Carrier Estimator For OFDM Communications," IEEE Communications Letters, vol. 2, No. 4, pp. 104-106, Apr. 1998.

X. Ma, et al., "Non-Data-Aided Carrier Offset Estimations For OFDM With Null Subcarriers: Identifiability, Algorithms, and Performance," IEEE Journal on Selected Areas in Communications, vol. 19, No. 12, pp. 2504-2515, Dec. 2001.

B. Li, et al., "Pilot-Tone Based ZP-OFDM Demodulation for an Underwater Acoustic Channel," in Proc. of MTS/IEEE OCEANS conference, Boston, MA, Sep. 18-21, 2006.

B. S. Sharif et al., "A Computationally Efficient Doppler Compensation System for Underwater Acoustic Communications," IEEE Journal of Oceanic Engineering, vol. 25, No. 1, pp. 52-61, Jan. 2000.

P. Beaujean, et al., "Adaptive Array Processing for High-Speed Acoustic Communication in Shallow Water," IEEE Journal of Oceanic Engineering, vol. 29, No. 3, pp. 807-823, Jul. 2004.

U. Tureli, et al., "A High-Efficiency Carrier Estimator For OFDM Communications," IEEE Communications Letters, vol. 2, No. 4, pp. 104-106, Apr. 1998.

X. Ma, et al., "Non-Data-Aided Carrier Offset Estimations For OFDM With Null Subcarriers: Identifiability, Algorithms, and Performance," IEEE Journal on Selected Areas in Communications, vol. 19, No. 12, pp. 2504-2515, Dec. 2001.

B. Li, et al., "Performance Results for the Underwater OFDM Experiment at Mudhole, Buzzards Bay, Dec.15, 2006," Technical Report, UCONN-WCRL-TR-2007-01, available at: http://www.engr.uconn.edu/~shengli/UCONN-WCRL-TR-2007-01.pdf.

R. K Martin, et al., "Adaptive Equalization: Transitioning From Single-Carrier to Multicarrier Systems," IEEE Signal Processing Magazine, vol. 22, No. 6, pp. 108-122, Nov. 2005.

J. Kleider, et al., "Adaptive Channel Shortening Equalization for Coherent OFDM Doubly Selective Channels," in Proc. of International Conference on Acoustics, Speech, and Signal Processing, Toulouse, France, May 15-19, 2006.

X. Ma, et al., "Superimposed Training For Channel Shortening Equalization in OFDM," in Proc. of Milcom, Oct. 2006.

B. Li, et al., "Performance Results for the Underwater OFDM Experiment at Woods Hole Harbor, Dec. 1, 2006," Technical Report, UCONN-WCRL-TR-2007-02, available at: http://www.engr.uconn.edu/~shengli/UCONN-WCRL-TR-2007-02.pdf.

B. Li, et al., "MIMO-OFDM Over an Underwater Acoustic Channel," in Proc. of MTS/IEEE OCEANS conference, Vancouver, BC, Canada, Sep. 29-Oct. 4, 2007.

B. Li, et al., "Multicarrier Underwater Acoustic Communications over Fast-Varying Channels," in IEEE Journal of Oceanic Engineering, submitted May 2007.

B. Li, et al., "Non-Uniform Doppler Compensation for Zero-Padded OFDM Over Fast-Varying Underwater Acoustic Channels," in Proc. of MTS/IEEE OCEANS conference, Aberdeen, Scotland, Jun. 18-2, 2007.

R.D.J. van Nee, et al., "New High-Rate Wireless LAN Standards," IEEE Transactions on Communications, vol. 50, No. 12, pp. 2136-2148, Dec. 2002.

A. Batra, et al., "Design of a Multiband OFDM System for Realistic UWB Channel Environments," IEEE Transactions on Microwave Theory and Techniques, vol. 52, No. 9, pp. 2123-2138, Sep. 2004.

L. Freitag, et al., "Integrated Doppler Tracking and Efficient Resampling for Phase Coherent Underwater Acoustic Receivers," IEEE J. Ocean. Eng., IN PRESS. Department of WHOI Author: APOE. Contribution No. 10606; Articles in Preparation Jan. 2002 (article identified on p. 2).

D. B. Kilfoyle, et al., "Spatial Modulation Experiments in the Underwater Acoustic Channel," IEEE Journal of Oceanic Engineering, vol. 30, No. 2, pp. 406-415, Apr. 2005.

S. Roy, et al., "High Rate Communication For Underwater Acoustic Channels Using Multiple Transmitters and Space-Time Coding: Receiver Structures and Experimental Results," IEEE Journal of Oceanic Engineering, Feb. 2007.

* cited by examiner (a) Single Channel Receiver Processing (b) Multiple Channel Receiver Processing (a)

(b)

APPARATUS, SYSTEMS AND METHODS FOR ENHANCED MULTI-CARRIER BASED UNDERWATER ACOUSTIC COMMUNICATIONS

CROSS-REFERENCE TO RELATED APPLICATIONS

The present application is related to and claims priority benefit to a co-pending, commonly assigned provisional patent application entitled "STABLE WIDEBAND OFDM SYSTEM FOR UNDERWATER ACOUSTIC COMMUNICATIONS," which was filed on Jun. 18, 2007 and assigned Ser. No. 60/936,167. The entire contents of the foregoing provisional patent application are incorporated herein by reference.

STATEMENT OF GOVERNMENT SUPPORT

The United States government may hold license and/or other rights in this invention as a result of financial support provided by governmental agencies in the development of aspects of the invention. Parts of this work were supported by a grant from the Office of Naval Research, Grant No.: N00014-07-1-0805, and by a grant from the National Science Foundation, Grant No.: ECCS-0725562.

BACKGROUND

1. Technical Field

The present disclosure relates to the field of underwater acoustic (UWA) communications. More particularly, the present disclosure relates to orthogonal frequency division multiplexing (OFDM) systems for UWA communications.

2. Background Art

Underwater acoustic (UWA) communication (the sending and receiving of acoustic signals underwater) is an inherently difficult and complex process. The unique characteristics of water as a propagation medium contribute to the problematic nature of UWA communication. Thus, due to factors like multi-path propagation, time variations of the channel, it is necessary to account for, inter alia, small available bandwidth and strong signal attenuation. Moreover, slow propagation speeds associated with acoustic signals lead to significant Doppler shifts and spreading. Thus, UWA communication systems are often times limited by reverberation and time variability beyond the capability of receiver algorithms.

Unlike the development of wireless networks over radio channels, the development of underwater communication systems has occurred at a much slower pace. See, e.g., M. Stojanovic, "Recent advances in high-speed underwater acoustic communications," IEEE Journal of Oceanic Engineering, Vol. 121, No. 2, pp. 125-136, April 1996; D. B. Kilfoyle and A. B. Baggeroer, "The state of the art in underwater acoustic telemetry," IEEE Journal of Oceanic Engineering, Vol. 25, No. 1, pp. 4-27, January 2000. The last two decades have witnessed only two fundamental advances in underwater acoustic communications. One significant advance is the introduction of digital communication techniques, namely, non-coherent frequency shift keying (FSK), in the early 1980's. See, e.g., D. J. Garrood, "Applications of the MFSK acoustical communication system," in Proc. of OCEANS, Boston, Mass., 1981; and A. Baggeroer, D. E. Koelsch, K. von der Heydt, and J. Catipovic, "DATS—a digital acoustic telemetry system for underwater communications," in Proc. of OCEANS, Boston, Mass., 1981. The other significant advance is the application of coherent modulation, including phase shift keying (PSK) and quadrature amplitude modulation (QAM) in the early 1990's. See, e.g., M. Stojanovic, J. A. Catipovic, and J. G. Proakis, "Adaptive multichannel combining and equalization for underwater acoustic communications," Journal of the Acoustical Society of America, Vol. 94, No. 3, pp. 1621-1631, 1993; and "Phase-coherent digital communications for underwater acoustic channels," THEE Journal of Oceanic Engineering, Vol. 19, No. 1, pp. 100-111, January 1994.

Existing (phase-coherent) UWA communication has mainly relied on serial single-carrier transmission and equalization techniques over the challenging UWA media. See, e.g., D. B. Kilfoyle and A. B. Baggeroer, "The state of the art in underwater acoustic telemetry," IEEE Journal of Oceanic, Engineering, Vol. 25, No. 1, pp. 4-27, January 2000. However, as data transfer rates increase, symbol durations decrease, causing a greater number of channel taps in the baseband discrete-time model (easily on the order of several hundreds taps). This level of signal degradation poses great challenges for the channel equalizer. Thus, data transfer rates for single-carrier UWA communication techniques are effectively limited by the required receiver complexity.

Multicarrier modulation in the form of orthogonal frequency division multiplexing (OFDM) has prevailed in recent broadband wireless radio applications due to the low complexity of receivers required to deal with highly dispersive channels. For example OFDM has been the "workhorse" modulation present in a number of practical broadband wireless systems, notably wireless local area networks (IEEE 802.11a/g/n) (See A. Doufexi, S. Armour, M. Butler, A. Nix, D. Bull, J. McGeehan, and P. Karlsson, "A comparison of the HIPERLAN/2 and IEEE 802.11a wireless LAN standards," IEEE Communications Magazine, Vol. 40, No. 5, pp. 172-180, May 2002), and wireless metropolitan area networks (IEEE 802.16) (See IEEE Standard 802.16 Working Group, IEEE standard for local and metropolitan area networks part 16; air interface for fixed broadband wireless access systems, 2002). The primary advantages of OFDM over single-carrier schemes is the ability to cope with severe channel conditions, e.g., frequency-selective fading due to multipath propagation without complex equalization filters. Channel equalization is simplified because OFDM may be viewed as using many slowly-modulated narrowband signals rather than one rapidly-modulated wideband signal. The low symbol rate makes the use of a guard interval between symbols affordable, making it possible to handle time-spreading and eliminate intersymbol interference (ISI). Channel equalization using OFDM is further simplified by approximating the effects of frequency-selective channel conditions as a constant for each OFDM sub-channel provided that each sub-channel is sufficiently narrow-band.

These advantages motivate the use of OFDM in underwater environments as well. See, e.g., S. Coatelan and A. Glavieux, "Design and test of a coded OFDM system on the shallow water acoustic channel," in Proc. of OCEANS, September 1994; B. Kim and I. Lu, "Sea trial results of a robust and spectral-efficient OFDM underwater communication system (Abstract)," The Journal of the Acoustical Society of America, Vol. 109, No. 5, p. 2477, May 1, 2001; and R. Bradbeer, E. Law, and L. F. Yeung, "Using multi-frequency modulation in a modem for the transmission of near-realtime video in an underwater environment," in Proc. of IEEE International Conference on Consumer Electronics, June 2003. However, as noted above, UWA channels are far more challenging than their radio counterparts. Specifically, with limited bandwidth, UWA channels are wideband in nature due to the small ratio of the carrier frequency to the signal bandwidth. Thus frequency-dependent Doppler drifts are introduced which destroy the orthogonality among OFDM subcarriers.

Table 1 highlights the challenges of multicarrier communication over underwater acoustic channels relative to wireless radio channels, e.g., IEEE802.11a/g, and OFDM based ultra-wideband (UWB) systems:

TABLE I

COMPARISON OF OFDM PARAMETERS IN UNDERWATER ACOUSTIC, RADIO, AND UWB CHANNELS

|  | Experiments for this paper | Wireless LAN [22] | OFDM UWB [23] |
|---|---|---|---|
| Propagation speed c | 1500 m/s | $3 \cdot 10^8$ m/s | $3 \cdot 10^8$ m/s |
| Bandwidth B | 12 kHz | 20 MHz | 528 MHz |
| Carrier frequency $f_c$ | 27 kHz | 5.2 GHz | 3~10 GHz frequency hopping |
| Narrowband ($B/f_c < 0.25$) or wideband ($B/f_c > 0.25$)? | wideband | narrowband | wideband |
| waveform time compression or expansion factor for a moving terminal with speed $\upsilon$ (a = $\upsilon$/c) | $1.3 \cdot 10^{-3}$ for $\upsilon$ = 2 m/s | $7 \cdot 10^{-8}$ for $\upsilon$ = 20 m/s | $7 \cdot 10^{-9}$ for $\upsilon$ = 2 m/s |
| Typical multipath spread $T_d$ | ~10 ms | ~500 ns | ~100 ns |
| Typical coherence time $T_c$ | ~1 s | ~5 ms | ~2 ms |
| One OFDM symbol duration | ~85 ms | 4 µs | 0.3 µs |

The following observations from Table 1 are noted:
1) A common definition of an (ultra) wideband radio is that the system bandwidth exceeds 500 MHz or is greater than 25% of the carrier frequency. Thus, although underwater acoustic channels have limited bandwidth, signaling must be treated as (ultra) wideband.
2) Relative motion between a transmitter and a receiver results in a Doppler-scaled communication signal. The distortion of the signal is proportional to the ratio of the relative speed of the transmitter to the receiver and the propagation speed. Thus, since sound propagates slowly underwater signal compression and/or expansion cannot be ignored for UWA channels.
3) In high-rate wireless radio applications, the symbol block period is small relative to the channel coherence time. Consequently, the channel can be viewed as time-invariant within one block. On the other hand, channel time-variation within one data block is not negligible for underwater applications, and thus it should be explicitly dealt with.

The existing literature concerning OFDM based UWA communication focuses mostly on conceptual system analysis and simulation based studies. See, e.g., E. Bejjani and J. C. Belfore, "Multicarrier coherent communications for the underwater acoustic channel," in Proc. of OCEANS, 1996; W. K. Lam and R. F. Ormondroyd, "A coherent COFDM modulation system for a time-varying frequency-selective underwater acoustic channel," in Proc. of the 7th International Conference on Electronic Engineering in Oceanography, June 1997, pp. 198-203; W. K. Lam, R. F. Ormondroyd, and J. J. Davies, "A frequency domain adaptive coded decision feedback equalizer for a broadband UWA COFDM system," in Proc. of OCEANS, 1998; and Y. V. Zakharov and V. P. Kodanev, "Multipath-Doppler diversity of OFDM signals in an underwater acoustic channel," in IEEE International Conference on Acoustics, Speech, and Signal Processing, Vol. 5, June 2000, pp. 2941-2944. Experimental results are far more scarce. See, e.g., S. Coatelan and A. Glavieux, "Design and test of a coded OFDM system on the shallow water acoustic channel," in Proc. of OCEANS, September 1994; B. Kim and I. Lu, "Sea trial results of a robust and spectral-efficient OFDM underwater communication system (Abstract)," The Journal of the Acoustical Society of America, Vol. 109, No. 5, pp. 2477 et seq., May 1, 2001; and R. Bradbeer, E. Law, and L. F. Yeung, "Using multi-frequency modulation in a modem for the transmission of near-realtime video in an underwater environment," in Proc. of IEEE International Conference on Consumer Electronics, June 2003.

More recently, several intensive investigations on underwater OFDM communication have been conducted. These investigations include: P. J. Gendron, "Orthogonal frequency division multiplexing with on-off-keying: Noncoherent performance bounds, receiver design and experimental results," U.S. Navy Journal of Underwater Acoustics, vol. 56, no. 2, pp. 267-300, April 2006; M. Stojanovic, "Low complexity OFDM detector for underwater channels," in Proc. of MTS/IEEE OCEANS conference, Boston, Mass., Sep. 18-21, 2006; and B. Li, S. Zhou, M. Stojanovic, and L. Freitag, "Pilot-tone based ZP-OFDM demodulation for an underwater acoustic channel," in Proc. of MTS/IEEE OCEANS conference, Boston, Mass., Sep. 18-21, 2006.

An example of current state-of-the-art technology for underwater communication is the Micro-Modem from Woods Hole Oceanographic Institution (WHOI) that supports a phase-shift-keying (PSK) mode at data rates of 300-5000 bps. The WHOI technology is described in the following publication, the contents of which are incorporated by reference herein in their entirety: L. Freitag, M. Grund, S. Singh, J. Partan, P. Koski, and K. Ball, "The WHOI Micro-Modem: An acoustic communications and navigation system for multiple platforms," in Proceeding of OCEANS, Washington D.C., 2005. Descriptions of other various existing approaches to UWA communications can be found, for example, at: M. Stojanovic, "Recent advances in high-speed underwater acoustic communications," IEEE Journal of Oceanic Engineering, Vol. 121, No. 2, pp. 125-136, April 1996; and, D. B. Kilfoyle and A. B. Baggeroer, "The state of the art in underwater acoustic telemetry," IEEE Journal of Oceanic Engineering, Vol. 25, No. 1, pp. 4-27, January 2000.

Current UWA communication systems, including specifically current OFDM based UWA communication systems, fail to adequately mitigate frequency-dependent Doppler drifts, thereby significantly limiting both the range and application of such systems. These and other disadvantages and/or limitations are addressed and/or overcome by the apparatus, systems and methods of the present disclosure.

SUMMARY

The present disclosure relates to apparatus, systems and methods for facilitating enhanced underwater acoustic (UWA) communications. More particularly, the present disclosure involves apparatus, systems and methods for applying orthogonal frequency division multiplexing (OFDM) to UWA communications. The disclosed approach represents a significant paradigm shift away from traditional single-carrier based UWA communications. Of note, OFDM divides the available bandwidth into a large number of overlapping subbands, such that the symbol duration is long compared to the multipath spread of the channel. Consequently, intersymbol interference (ISI) may be neglected in each subband, greatly simplifying receiver complexity and channel equalization.

Exemplary embodiments of the disclosed apparatus, systems and methods adopt and/or employ zero-padded OFDM (ZP-OFDM) for application in UWA communications. (See, e.g., Z. Wang and C. B. Giannakis, "Wireless multicarrier communications: Where Fourier meets Shannon," IEEE Signal Processing Magazine, Vol. 17, No. 3, pp. 29-48, May 2000; and B. Muquer, Z. Wang, G. B. Giannakis, M. de Courville, and P. Duhamel, "Cyclic prefix or zero-padding for multi-carrier transmissions?" IEEE Transactions on Communications, Vol. 50, No. 12, pp. 2136-2148, December 2002). ZP-OFDM may be advantageously used instead of conventional cyclic prefix OFDM in order to save transmission power on the long guard interval.

The performance of conventional ZP-OFDM systems, however, is severely limited by intercarrier interference (ICI) due to fast channel variations within each OFDM symbol. Furthermore, UWA channels are wideband in nature due to a small carrier frequency to signal bandwidth ratio. Thus, resulting frequency-dependent Doppler drifts render existing ICI reduction techniques ineffective.

The disclosed apparatus, systems and methods employ an advantageous two-step approach to mitigating resulting frequency-dependent Doppler drifts. The two-step approach involves: (1) non-uniform Doppler compensation via resampling (in order to convert a "wideband" problem into a "narrowband" problem), and (2) high-resolution uniform compensation on the residual Doppler (for best ICI reduction). More particularly, in exemplary embodiments of the present disclosure, resampling is achieved by using the preamble and the postamble of a packet consisting of multiple ZP-OFDM blocks to estimate a resampling factor (also referred to as the Doppler scale). Note that a Doppler scale estimation is advantageously used for resampling of a signal, thus, eliminating the need for conventional Doppler frequency shift estimation. Null subcarriers are used to facilitate high-resolution residual Doppler compensation. In addition, pilot subcarriers are used for channel estimation.

The exemplary receiver algorithms disclosed herein are based on block-by-block processing, and do not rely on channel dependence across OFDM blocks. Thus, the disclosed apparatus, systems and methods are effective for fast-varying underwater acoustic channels. It is noted that the utility and the robustness of the disclosed apparatus, systems and methods have been confirmed by two experiments conducted in shallow water (at Woods Hole Harbor, Mass., on Dec. 1, 2006, and at Buzzards Bay, Mass., on Dec. 15, 2006). Excellent performance was observed even for Doppler shifts affected by a relative speed of up to 10 knots (wherein the Doppler drifts were significantly larger than the OFDM subcarrier spacing).

Thus, the disclosed apparatus, systems and methods provide significant improvements over previously existing technologies for, inter alia, high-rate underwater acoustic communications utilizing fast-varying channels. More particularly, the advantages of the present disclosure over existing single-carrier technologies include: (i) a highly scalable design due to low receiver complexity even for high data transmission rates, (ii) the ability to compensate for significant Doppler drifts, and (iii) robustness to sudden channel changes without requiring manual tuning. Thus, the disclosed apparatus, systems and methods provide enhanced UWA communications both at a high-rate and with high-mobility.

Additional features, functions and benefits of the disclosed apparatus, systems and methods will be apparent from the description which follows, particularly when read in conjunction with the appended figures.

BRIEF DESCRIPTION OF THE DRAWINGS

To assist those of ordinary skill in the art in making and using the disclosed apparatus, systems and methods, reference is made to the appended figures, wherein.

DESCRIPTION OF EXEMPLARY EMBODIMENT(S)

According to the present disclosure, advantageous apparatus, systems and methods are provided for facilitating enhanced underwater acoustic (UWA) communications. More particularly, the disclosed apparatus, systems and methods generally involve mitigating frequency-dependent Doppler drifts in a received signal. In exemplary embodiments, the present disclosure employs orthogonal frequency division multiplexing (OFDM), e.g., zero-padded orthogonal frequency division multiplexing (ZP-OFDM), in UWA communications. The disclosed apparatus, systems and methods employ an advantageous two-step approach to mitigating frequency-dependent Doppler drifts in a received signal that involves: (1) non-uniform Doppler compensation via resampling, and (2) high-resolution uniform compensation on the residual Doppler.

In exemplary embodiments, a received signal, e.g. a ZP-OFDM signal, is directly sampled and all processing is performed on discrete-time entries. The disclosed apparatus, systems and methods may employ single-channel or multiple-channel reception. Both mechanisms are discussed herein.

Figure 1:
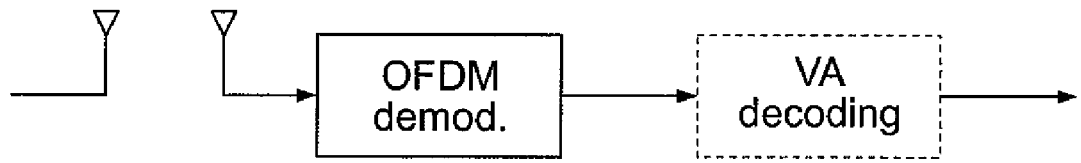
FIG. 1 depicts a general receiver diagram for (a) single-channel reception and (b) multi-channel reception.
Figure 1:
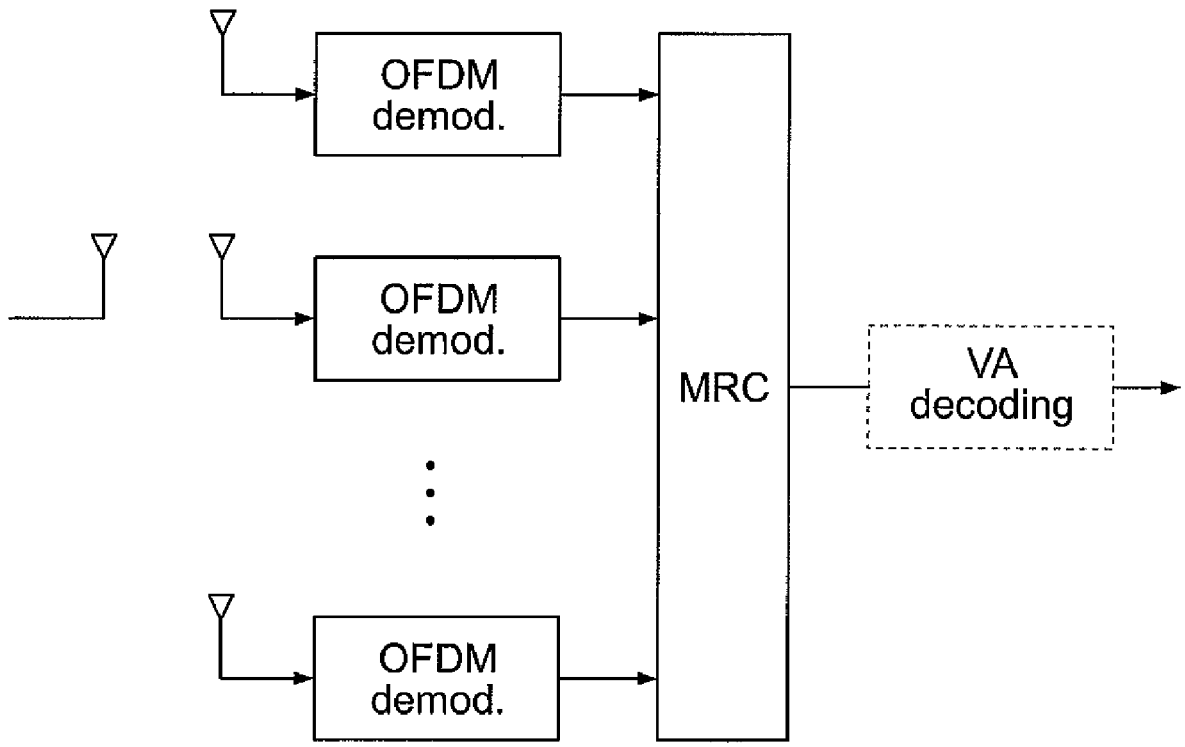

With initial reference to FIG. 1, block diagrams typifying single channel reception (FIG. 1(a)) and multi-channel reception using maximum-ratio-combining (MRC) (FIG. 1(b)) are depicted. Viterbi algorithm (VA) decoding may be employed to test performance with channel coding. It is noted that multi-channel reception may greatly improve UWA communication performance through signal diversity. (See e.g., M. Stojanovic, J. A. Catipovic, and J. G. Proakis, "Adaptive multichannel combining and equalization for underwater acoustic communications," Journal of the Acoustical Society of America, Vol. 94, No. 3, pp. 1621-1631, 1993.) Multi-channel combining may easily be performed using individual subcarriers for OFDM based communications.

Figure 2:
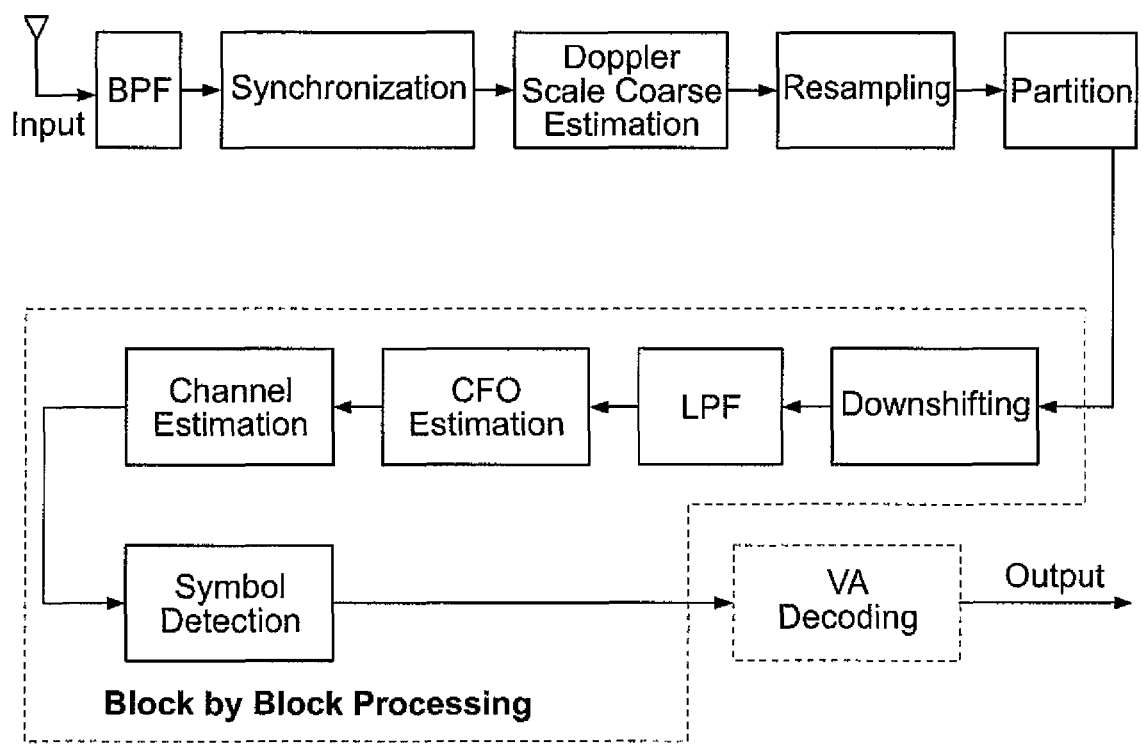
FIG. 2 depicts an exemplary detailed receiver diagram for single-channel reception.

With reference now to FIG. 2, a block diagram of exemplary receiver signal processing according to the present disclosure is depicted. In general, the following basic steps are used to process data packets for a received signal (Input): (1) bandpass filtering of the received signal to suppress out-of-band noise; (2) synchronization of the preamble and postamble of a data packet, e.g., by identifying correlation peaks (see also FIG. 3); (3) coarse estimation of the Doppler scale, b (for the sake of efficiency, only one estimation is generally made per packet); (4) resampling of the packet and partitioning it into OFDM blocks; and (5) block-by-block OFDM demodulation. Typically, block-by-block OFDM demodulation may include the following substeps: (a) conversion of the passband signal to baseband via downshifting and lowpass filtering; (b) CFO (carrier frequency offset or c) estimation and compensation; (c) channel estimation based on pilot tones; and (d) symbol-by-symbol demodulation on each subcarrier. In exemplary embodiments, block-by-block OFDM demodulation may include the additional step of fine estimation of the Doppler scale, b, after conversion of the input signal to baseband. Block-by-block demodulation may also include VA decoding based on soft input for coded signals. In exemplary embodiments, block errors may be corrected via auto-repeat request (ARQ) procedures, or via coding strategies such as rateless coding (see D. MacKay, "Information Theory, Inference, and Learning Algorithms," Chapter 50, Cambridge University Press, 2003).

In practice, the Doppler scale factor, A, and the CFO term, c, are generally determined from received data and may be jointly or separately estimated. It is noted that each attempted estimation of b is associated with a potentially taxing resampling operation. It is, therefore, desirable to efficiently estimate b, thus minimizing the required number of resampling operations. It is also noted that high-resolution algorithms are generally required to fine-tune the CFO term, a, for best ICI reduction. Exemplary receiver algorithms for Doppler scale and CFO estimation are presented according to the present disclosure. The disclosed apparatus, systems and methods are not limited to the exemplary receiver algorithms disclosed herein. Indeed, other mechanisms for Doppler scale and CFO estimation may be employed without departing from the scope and spirit of the present disclosure. All such modifications/alterations are expressly encompassed herein.

1. The Transmitted and Received Signal for ZP-OFDM

In exemplary embodiments, zero-padded OFDM (ZP-OFDM) is used instead of conventional cyclic prefix OFDM in order to save transmission power on the long guard interval.

If T denotes the OFDM duration and $T_g$ the guard interval, the total OFDM block duration is $T'=T+T_g$. The frequency spacing is $\Delta_f=1/T$. The kth subcarrier is at frequency:

$$f_k = f_c + k\Delta_f, \quad k = -K/2, \ldots, K/2-1 \qquad (1)$$

where $f_c$ is the carrier frequency and K subcarriers are used so that the bandwidth is $B=K\Delta_f$.

For a single ZP-OFDM block, d[k] may be used to denote the information symbol to be transmitted on the kth subcarrier. The set of active subcarriers $S_A$ and the set of null subcarriers $S_N$ satisfy $S_A \cup S_N = \{-K/2, \ldots, K/2-1\}$. Thus, the transmitted signal in passband, s(t), is given by:

$$s(t) = \mathrm{Re}\left\{\left[\sum_{k \in S_A} d[k]e^{j2\pi k\Delta_f t}g(t)\right]e^{j2\pi f_c t}\right\}, t \in [0, T+T_g], \qquad (2)$$

where the zero-padding operation, g(t) is defined as:

$$g(t) = \begin{cases} 1, & t \in [0, T] \\ 0, & t \in [T, T+T_g], \end{cases} \qquad (3)$$

Next, an impulse response for a multipath underwater channel may be defined as:

$$c(t, \tau) = \sum_p A_p(t)\delta(\tau - \tau_p(t)), \qquad (4)$$

where $A_p(t)$ is the path amplitude and $\tau_p(t)$ is the time-varying path delay.

Assuming that all paths have a similar Doppler rate, a, the time-varying path delay $\tau_p(t)$ can be defined as:

$$\tau_p(t) \approx \tau_p - at \qquad (5)$$

In theory, different paths could potentially have different Doppler scaling factors. The apparatus, systems and method proposed herein, however, build on an assumption that all paths have the same Doppler scaling factor. Thus, when the Doppler scaling factors vary path to path, part of the useful signal is treated as additive noise, and the overall noise variance is increased considerably. Note, however, that the assumption of a uniform Doppler scaling factor generally holds true, provided that the dominant Doppler shift in question is caused by direct relative motion between a transmitter and a receiver.

Finally, assuming that the path gains $A_p$ and the Doppler rate a are constant over the block duration T'. The received signal in passband, $\tilde{y}(t)$, is given by:

$$\tilde{y}(t) = \quad (6)$$

$$\text{Re}\left\{\sum_p A_p \left[\sum_{k \in S_A} d[k] e^{jt2\pi\Delta f(t+at-\tau_p)} g(t+at-\tau_p)\right] e^{j2\pi f_c(t+at-\tau_p)}\right\} + \tilde{n}(t),$$

where $\tilde{n}(t)$ is the additive noise.

In theory, the path gains $A_p$ and/or the Doppler rate a may vary. However, the assumptions of constant path gains and a constant Doppler rate generally hold true, e.g., for channel coherence times on the order of seconds. Thus, the assumptions of constant path gains and a constant Doppler rate hold true, e.g., in exemplary applications where T'=42.67, 85.33, 170.67 ms and K=512, 1024, 2048, respectively.

The baseband version, y(t), of the received signal satisfies $\tilde{y}(t) = \text{Re}\{y(t)e^{j2\pi f_c t}\}$, and can be written as:

$$y(t) = \sum_p A_p \left[\sum_{k \in S_A} d[k] e^{j2\pi k \Delta f(t+at-\tau_p)} g(t+at-\tau_p)\right] e^{j2\pi f_c(at-\tau_p)} + \quad (7)$$

$$n(t)$$

$$= \sum_{k \in S_A} d[k] e^{j2\pi k \Delta f t} e^{j2\pi a f_k t} \left[\sum_p A_p e^{-j2\pi f_k \tau_p} g(t+at-\tau_p)\right] + n(t),$$

where n(t) is the additive noise in baseband.

Based on equation (7), two effects are noted: (i) the signal from each path is scaled in duration, from T to T/(1+a); and (ii) each subcarrier experiences a Doppler shift $e^{j2\pi a f_k t}$, which depends on the frequency of the subcarrier. Since the bandwidth of OFDM is comparable to the center frequency, the Doppler shifts on different OFDM subcarriers differ considerably; i.e., a narrowband assumption does not hold true. Thus, the frequency-dependent Doppler shifts introduce strong intercarrier interference (ICI) necessitating effective Doppler compensation prior to OFDM demodulation 2. Conventional ZP-OFDM without Doppler Compensation For a conventional OFDM receiver that does not perform any Doppler compensation of the baseband received signal, y(t), the output of the demodulator in the mth subchannel, $y_m$, is defined as:

$$y_m = \frac{1}{T} \int_0^{T_g+T} y(t) e^{-j2\pi m \Delta f t} dt = \frac{1}{T} \int_0^T [y(t) + y(t+T)] e^{-j2\pi m \Delta f t} dt, \quad (8)$$

where correlation may be performed by overlap-add of the received signal followed by fast Fourier transform (FFT) processing. (See, e.g., Z. Wang and G. B. Giannakis, "Wireless multicarrier communications: Where Fourier meets Shannon," IEEE Signal Processing Magazine, Vol. 17, No. 3, pp. 29-48, May 2000; and B. Muquet, Z. Wang, G. B. Giannakis, M. de Courville, and P. Duhamel, "Cyclic prefix or zero-padding for multi-carrier transmissions?" IEEE Transactions on Communications, Vol. 50, No. 12, pp. 2136-2148, December 2002).

By substituting equation (7) into equation (8) and assuming that $T_g$ is greater than the channel delay spread, the following equation is obtained:

$$y_m = \sum_{k \in S_A} d[k] \sum_p A_p e^{-j2\pi f_k \tau_p} \frac{1}{T} \int_{\tau_p/(1+a)}^{(T+\tau_p)/(1+a)} e^{j2\pi[(k-m)\Delta f + a f_k]t} dt + \quad (9)$$

$$n_m$$

$$= C\left(\frac{f_m}{1+a}\right) \sum_{k \in S_A} d[k] \rho_{m,k} + n_m \text{ where:}$$

$$C(f) = \sum_p A_p e^{-j2\pi f \tau_p}, \quad \alpha_{m,k} = \frac{(m-k) + \alpha f_k / \Delta t}{1+\alpha}, \quad (10)$$

$$\rho_{m,k} = \frac{1}{1+\alpha} e^{j\alpha_{m,k}} \text{sinc}(\alpha_{m,k}).$$

It is noted that, for the demodulated signal, $y_m$, the actual desired signal is $C(f_m/1+\alpha)\rho_{m,m}d[m]$; the remainder of the demodulated signal represents intercarrier interference (ICI) pulse additive noise. Thus the signal to interference-plus-noise ratio, $\gamma_m$, is:

$$\gamma_m = \frac{|\rho_{m,m}|^2 \sigma_d^2}{\sigma_v^2/|C(f_m/(1+a))|^2 + \sum_{k \neq m} |\rho_{m,k}|^2 \sigma_d^2}, \quad (11)$$

where $\sigma_v^2$ is the noise variance and $\sigma_d^2 = E[|d[m]|^2]$. It is noted that $\gamma_m$ has a floor which does not depend on the channel frequency response when $\sigma_v^2$ goes to zero.

Based on equation (11), two special cases exist wherein conventional ZP-OFDM produces a desirable signal to interference-plus-noise ratio: (i) for purely frequency-selective channels, where $\tau_p(t)$ is time-invariant (i.e., a=0 in equation (5)); and (ii) for narrowband systems, where Doppler scaling is negligible (i.e., a→0).

For the case of purely frequency-selective channels, the received baseband signal (disregarding noise) is:

$$y_0(t) = \sum_{k \in S_A} d[k] e^{j2\pi k \Delta f t} \left[\sum_p A_p e^{-j2\pi f_k \tau_p} g(t - \tau_p)\right], \quad (12)$$

It is noted that $y_0(t)$ does not suffer from any Doppler distortion and as a result $\rho_{m,m}=1$ and $\rho_{m,k}=0$, $\forall m \neq k$.

Thus, the correlation output in equation (9) is ICI-free, i.e.:

$$y_m = C(f_m) d[m] + n_m \quad (13)$$

Channel equalization in the frequency domain is also simplified, amounting to simple scalar inversion of each subcarrier. Thus, OFDM is particularly advantageous over time-invariant, but highly dispersive, multipath channels. For the case of a narrowband system, a narrowband assumption may be made wherein:

$$af_k \approx af_c \quad (14)$$

Thus, the received baseband signal (disregarding noise) may be reduced to:

$$y(t) \approx e^{j2\pi a f_c t} \sum_{k \in S_A} d[k] e^{j2\pi k \Delta f t} \left[ \sum_p A_p e^{-j2\pi f_k \tau_p} g(t + at - \tau_p) \right] \quad (15)$$

$$\approx e^{j2\pi a f_c t} y_0(t),$$

where $y_0(t)$ is the signal corresponding to a time invariant purely frequency-selective channel (see, e.g., equation 12).

Since a is extremely small for radio channels, the narrowband model presented in equation (15) is widely adopted. In radio applications, carrier frequency offset (CFO) between the transmitter and the receiver results in a received signal y(t) as defined in equation (15). See, e.g., U. Tureli and H. Liu, "A high-efficiency carrier estimator for OFDM communications," IEEE Communications Letters, Vol. 2, No. 4, pp. 104-106, April 1998; and X. Ma, C. Tepedelenliogi, C. B. Giannakis, and S. Barbarossa, "Non-data-aided carrier offset estimations for OFDM with null subcarriers: Identifiability, algorithms, and performance," IEEE Journal on Selected Areas in Communications, Vol. 19, No. 12, pp. 2504-2515, December 2001. For this reason, the $af_c$ term in equation (15) may also be referred to as the CFO of a narrowband system. Of note, in B. Li, S. Zhou, M. Stojanovic, and L. Freitag, "Pilot-tone based ZP-OFDM demodulation for an underwater acoustic channel," in Proc. of MTS/IEEE OCEANS conference, Boston, Mass., Sep. 18-21, 2006, a narrowband model was considered for a stationary transmitter and receivers, and a single CFO per receive hydrophone was estimated and compensated.

3. Mitigating the Doppler Effect for Fast-Varying Channels

As discussed above, the performance of a conventional ZP-OFDM system is severely limited by intercarrier interference (ICI) due to fast channel variations within each OFDM symbol as well as by frequency-dependent Doppler drifts which render existing ICI reduction techniques ineffective. To address these shortcomings, the disclosed apparatus, systems and methods provide an advantageous two step approach to mitigating Doppler effects even for fast-varying UWA channels. The two steps involve: (1) non-uniform Doppler compensation via resampling to convert a "wideband" problem into a "narrowband" problem, and (2) high-resolution uniform compensation on residual Doppler to fine-tune the CFO term corresponding to the "narrowband" model for best ICI reduction (e.g., $af_c$ in equation (15)).

The resampling methodology has effectively been shown to handle time-scale changes in underwater communications; see, e.g., B. S. Sharif, J. Neasham, O. R. Hinton, and A. E. Adams, "A computationally efficient Doppler compensation system for underwater acoustic communications," IEEE Journal of Oceanic Engineering, vol. 25, no. 1, pp. 52-61, January 2000; and P. Beaujean and L. R. LeBlanc, "Adaptive array processing for high-speed acoustic communication in shallow water," IEEE Journal of Oceanic Engineering, vol. 29, no. 3, pp. 807-823, July 2004.

In exemplary embodiments, the resampling process and residual Doppler compensation use baseband signals. However, these steps may be performed using either passband or baseband signals, as will be readily apparent to persons reasonably skilled in the art from the description provided herein.

In exemplary embodiments, the received waveform in baseband, y(t), (see equation (7)) is resampled with a resampling factor b:

$$z(t) = y\left(\frac{t}{1+b}\right). \quad (16)$$

Resampling has two effects: (1) it rescales the waveform, and (2) it introduces a frequency-dependent Doppler compensation. Thus, combining equation (7) into equation (16) (disregarding noise n(t)):

$$z(t) = \quad (17)$$
$$e^{j2\pi f_c ta/(1+b)} \sum_{k \in S_A} d[k] e^{j2\pi k \Delta f \frac{1+a}{1+b} t} \left[ \sum_p A_p e^{-j2\pi f_k \tau_p} g\left(\frac{1+a}{1+b} t - \tau_p\right) \right].$$

where the goal is to make $$\frac{1+a}{1+b} \quad (18)$$

as close as possible to 1. As $(1+a)/(1+b)$ approaches 1, z(t) can be approximated as:

$$z(t) \approx e^{j2\pi f_c ta/(1+b)} \sum_k d[k] e^{j2\pi k \Delta f t} \left[ \sum_p A_p e^{-j2\pi f_k \tau_p} g(t - \tau_p) \right] \quad (19)$$

where the Doppler effect is the same for all subcarriers. Thus, a wideband OFDM system is converted into a narrowband OFDM system via equation (15), with a common CFO, $\epsilon$:

$$\varepsilon = \frac{a}{1+b} f_c \quad (20)$$

Compensating for the CFO in z(t) the following is obtained:

$$e^{-j2\pi \varepsilon t} z(t) \approx \sum_{k \in S_A} d[k] e^{j2\pi k \Delta f t} \left[ \sum_p A_p e^{-j2\pi f_k \tau_p} g(t - \tau_p) \right], \quad (21)$$

the correlation output of which is ICI-free based on equation (13).

Finally, rescaling and phase-rotation of the received signal restores the orthogonality of the subcarriers.

4. Coarse Estimation of the Doppler Scale

In exemplary embodiments, coarse estimation of the Doppler scale is based on the preamble and the postamble of a data packet. By cross-correlating the received signal with the known preamble and postamble, the receiver estimates the time duration of a packet, $T_{rx}$. By comparing the time duration of the packet at the receiver side, $T_{rx}$, with the time duration of the packet at the transmitter side, $T_{tx}$, it is possible to infer how the received signal has been compressed or dilated by the channel:

$$T_{rx} = (1+\hat{a})T_{tx} \Rightarrow \hat{a} = \frac{T_{rx}}{T_{tx}} - 1. \quad (22)$$

where the packet is then resampled with a resampling factor b=â. In exemplary embodiments, a polyphase-interpolation based resampling method may be used, e.g., the polyphase-interpolation based resampling method available in Matlab.

5. Estimation of the CFO term Using Null Subcarriers

In exemplary embodiments, null subcarriers are used to estimate the CFO term. For purposes of the present disclosure: (i) bold upper and lower letters denote matrices and column vectors, respectively; (ii) $(\cdot)^T$, $(\cdot)^*$, and $(\cdot)^{\mathcal{H}}$ denote transpose, conjugate, and Hermitian transpose, respectively; and (iii) $\Re\{\cdot\}$ stands for the real part of a complex number. During resampling, K+L samples for each OFDM block are collected; these samples may be represented as a vector, $z=[z(0), \ldots, z(K+L-1)]^T$, wherein L is the channel length in discrete-time. The channel length, L, may be inferred based on the synchronization output of the preamble and need not be very accurate. A (K+L)-by-1 vector may then be defined as $f_m=[1, e^{j2\pi m/K}, \ldots, e^{j2\pi m(K+L-1)/K}]^T$, and a (K+L)-by-(K+L) diagonal matrix may be defined as $\Gamma(\epsilon)=\text{diag}(1, e^{j2\pi T_o \epsilon}, \ldots, e^{j2\pi T_c(K+L-1)\epsilon})$, wherein the time interval for each sample, $T_c$, is $T_c=T/K$. The energy, $J(\epsilon)$, of the null subcarriers is used as a cost function:

$$J(\varepsilon) = \sum_{m \in S_N} |f_m^{\mathcal{H}} \Gamma^{\mathcal{H}}(\varepsilon)z|^2. \quad (23)$$

Thus, the null subcarriers will not see ICI spilled over from neighboring data subcarriers for a correct CFO estimation. Hence, the CFO term, $\epsilon$, may be estimated using:

$$\hat{\varepsilon} = \underset{\varepsilon}{\arg\min} \, J(\varepsilon), \quad (24)$$

This high resolution algorithm may be solved for $\epsilon$ using a one-dimensional search, via the MUSIC-like algorithm approach proposed for cyclic-prefixed OFDM in U. Tureli and H. Liu, "A high-efficiency carrier estimator for OFDM communications," IEEE Communications Letters, Vol. 2, No. 4, pp. 104-106, April 1998, or using a coarse-grid followed by a bisectional search.

Alternatively, equation (24) may also be solved using the standard Gradient method. See, e.g., X. Ma, C. Tepedelenlioglu, G. B. Giannakis, and S. Barbarossa, "Non-data-aided carrier offset estimations for OFDM with null subcarriers: Identifiability, algorithms, and performance," IEEE Journal on Selected Areas in Communications, Vol. 19, No. 12, pp. 2504-2515, December 2001. Thus:

$$\hat{\varepsilon}_{i+1} = \hat{\varepsilon}_i - \mu \frac{\partial J(\varepsilon)}{\partial \varepsilon}\bigg|_{\varepsilon=\hat{\varepsilon}_i}, \quad (25)$$

where i is the iteration index, µ is the step size, and:

$$\frac{\partial J(\varepsilon)}{\partial \varepsilon} = 2\pi T_c \sum_{m \in S_N} \Re\{j f_m^{\mathcal{H}} \Gamma^{\mathcal{H}}(\varepsilon) z z^{\mathcal{H}} \Gamma(\varepsilon) D_1 f_m\}, \quad (26)$$

where $D_1:=\text{diag}(0, 1, \ldots, K+L-1)$.

6. Joint Estimation of the Doppler Scale and the CFO Term Using Null Subcarriers In exemplary embodiments, the use of null subcarriers may also facilitate joint resampling and CFO estimation. This approach corresponds to a two-dimensional search wherein the scaling factor, b, and the CFO term, c, are estimated for the least signal spill-over into null subcarriers. The computational complexity for a two-dimensional search is high; however, this approach may be used even in applications where data for a coarse Doppler scale estimation is unavailable (e.g., where the pre- and post-amble of a packet are unknown or indeterminate at the receiving end).

7. Pilot-Tone Based Channel Estimation

In exemplary embodiments, pilot-tone based channel estimation is employed. After resampling and CEO compensation, ICI for a received signal is greatly reduced and can generally be ignored. Thus, the signal on the mth subchannel may be represented as:

$$z_m = f_m^H \Gamma^H(\hat{\varepsilon}) z = H(m) d[m] + v_m, \quad (27)$$

where H(m) is the channel frequency response at the mth subcarrier and $v_m$ is additive noise. On a multipath channel, the coefficient H(m) may be related to the equivalent discrete-time baseband channel parameterized by L complex-valued coefficients $\{h_l\}_{l=0}^{L-1}$ through:

$$H(m) = \sum_{l=0}^{L-1} h_l e^{-j2\pi lm/K}. \quad (28)$$

To estimate the channel frequency response, $N_p$ pilot tones may be used at subcarrier indices $p_1, \ldots, p_{N_p}$; e.g., $$\{d[p_i]\}_{i=1}^{N_p}$$

are known to the receiver. Thus, as long as $N_p \geq L+1$, the channel taps can be determined based on a least-square formulation:

$$\underbrace{\begin{bmatrix} z_{p_1} \\ \vdots \\ z_{p_{N_p}} \end{bmatrix}}_{:=z_p} = \underbrace{\begin{bmatrix} d[p_1] & & \\ & \ddots & \\ & & d[p_{N_p}] \end{bmatrix}}_{:=D_a} \quad (29)$$

-continued $$\underbrace{\begin{bmatrix} 1 & e^{-j\frac{2\pi}{K}p_1} & \cdots & e^{-j\frac{2\pi}{K}p_1 L} \\ \vdots & \vdots & \ddots & \vdots \\ 1 & e^{-j\frac{2\pi}{K}p_{N_p}} & \cdots & e^{-j\frac{2\pi}{K}p_{N_p} L} \end{bmatrix}}_{:=V} \underbrace{\begin{bmatrix} h[0] \\ \vdots \\ h[L] \end{bmatrix}}_{:=h} + \begin{bmatrix} v_{p_1} \\ \vdots \\ v_{p_{N_p}} \end{bmatrix}.$$

Treating h as deterministic but unknown, the least square (LS) estimate of h is:

$$\hat{h}_{LS} = \arg\min_h \|z_p - D_s Vh\|^2 = (V^{\mathcal{H}} D_s^{\mathcal{H}} D_s V)^{-1} V^{\mathcal{H}} D_s^{\mathcal{H}} z_p. \quad (30)$$

To simplify receiver complexity, two basic design rules may be advantageously employed: (1) the $N_p$ pilot symbols are equally spaced within K subcarriers; and (2) the pilot symbols are PSK signals with unit amplitude. Thus, from the first design rule: and from the second design rule:

$$V^H V = N_p I_{L+1}$$

and from the second design rule:

$$D_s^H D_s = I_{N_p}.$$

Thus, the LS solution in equation (30) simplifies to:

$$\hat{h}_{LS} = \frac{1}{N_p} V^{\mathcal{H}} D_s^{\mathcal{H}} z_p. \quad (31)$$

The time-domain channel estimate, $\hat{h}_{LS}$, is used in conjunction with equation (28) to determine H(m) for all m subcarriers. Note that this solution does not involve matrix inversion, and may advantageously be implemented by an $N_p$-point inverse fast Fourier transform (IFFT).

8. Multi-Channel Combining

In exemplary embodiments, multi-channel combining is performed on each subcarrier for a received OFDM based signal. Thus, for $N_r$ receiving elements:

$$\underbrace{\begin{bmatrix} z_m^1 \\ \vdots \\ z_m^{N_v} \end{bmatrix}}_{:=\bar{z}_m} = \underbrace{\begin{bmatrix} H^1(m) \\ \vdots \\ H^{N_v}(m) \end{bmatrix}}_{:=\bar{h}_m} d[m] + \underbrace{\begin{bmatrix} v_m^1 \\ \vdots \\ v_m^{N_v} \end{bmatrix}}_{:=\bar{v}_m}. \quad (32)$$

where $z_m^r$, $H_r(m)$, and $v_m^r$ denote the output, the channel frequency response, and the additive noise, respectively, for the mth subcarrier of the rth element.

Assuming that $\bar{v}_m$ has independent and identically distributed entries, the optimal maximum-ratio combining (MRC) yields:

$$\hat{d}[m] = [\bar{h}_m^H \bar{h}_m]^{-1} \bar{h}_m^H \bar{z}_m. \quad (33)$$

In exemplary embodiments, Doppler scale estimation, CFO estimation, and channel estimation are performed independently on each receiving element according to the procedure described herein. An estimate of the channel vector $h_m$ is then formed, and used to obtain the data symbol estimates for equation (33). It is noted that the channel vector, $h_m$, may be approximated from, e.g., pilot-tone based channel estimations of each receiving element.

Experimental Work

Signal Design for Underwater Experiments

For the purposes of empirically testing the disclosed apparatus, systems and methods, an OFDM signal was required. Thus, a transmitted signal was designed with a bandwidth, B=12 kHz, and a carrier frequency, $f_c$=27 kHz (occupying the frequency band between 21 kHz and 33 kHz). The signal employed zero-padded OFDM (ZP-OFDM) with a guard interval of $T_g$=25 ms per OFDM block. The number of subcarriers, K, used in the experiment varied; A=512, K=1024, and K=2048. The corresponding subcarrier spacings were $\Delta_f$=23.44 Hz, 11.72 Hz, and 5.86 Hz, respectively. Thus, the OFDM block durations, T=1/$\Delta_f$, were 42.67 ms, 85.33 ms, and 170.67 ms. Rate ⅔ convolutional coding, obtained by puncturing a rate ½ code with polynomial (23,35), and QPSK modulation was used to modulate the signal. Coding was applied within the data stream for each block. Each packet included $N_d$=30976 information bits. Thus, for K=512, 1024, 2048, each packet contained $N_b$=64, 32, 16 OFDM blocks, respectively. The signal parameters are summarized in Tables II and III, (where the overhead of null subcarriers and $K_p$=K/4 pilot subcarriers is accounted for):

TABLE II

SELECTION OF THE OFDM SIGNAL PARAMETERS.

| K | $\Delta f = \frac{B}{K}$ [Hz] | T = 1/$\Delta f$ [ms] | $\frac{T_g}{T}$ |
|---|---|---|---|
| 512 | 23.44 | 42.67 | 0.586 |
| 1024 | 11.72 | 85.33 | 0.293 |
| 2048 | 5.86 | 170.67 | 0.146 |

TABLE III

INPUT DATA STRUCTURE AND ACHIEVED BIT RATES

| K | input bits or symbols ($N_d$) | # of active subcarriers ($K_a$) | # of null subcarriers ($K_n$) | # of blocks in a packet ($N_b$) | raw bit rates over B = 12 kHz $2K_a/(T + T_g)$ | bit rates excluding K/4 pilot tones (uncoded) $2(K_a - K/4)/(T + T_g)$ |
|---|---|---|---|---|---|---|
| 512 | 30976 | 484 | 28 | 64 | 14.30 kbps | 10.52 kbps |
| 1024 | 30976 | 968 | 56 | 32 | 17.55 kbps | 12.90 kbps |
| 2048 | 30976 | 1936 | 112 | 16 | 19.79 kbps | 14.55 kbps |

Figure 3:
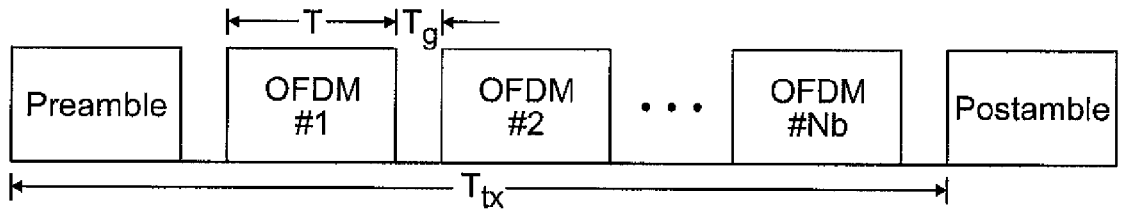
FIG. 3 depicts the general structure of a packet that includes a preamble, postamble, and "Nd" OFDM blocks.
Figure 4:
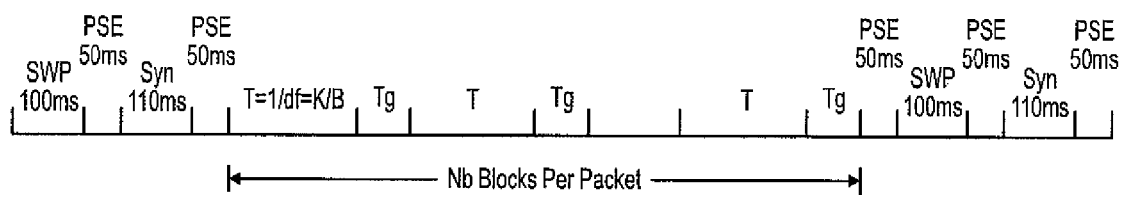
FIG. 4 depicts the detailed structure of an exemplary packet that includes a preamble, postamble, and "Nd" OFDM blocks.

With reference now to FIG. 3 and FIG. 4, an exemplary packet structure for the transmitted signal is depicted. Thus, each packet generally includes: a preamble (e.g., SWP 100 ms, PSE 50 ms, Syn 110 ms and PSE 50 ms), $N_b$ OFDM blocks (each including a guard interval, $T_g$), and a postamble (e.g., PSE 50 ms, SWP 100 ms, PSE 50 ms, Syn 110 ms and PSE 50 ms).

Figure 5:
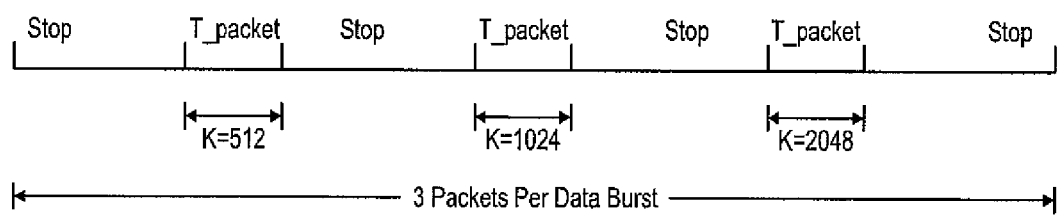
FIG. 5 depicts a single data burst consisting of three packets (K=512, K=1024, and K=2048, respectively).

With reference now to FIG. 5, a data burst consisting of three packets with varying numbers of subcarriers, K, is depicted (K=512, K=1024, and K=2048, respectively). For experimental purposes, the same data burst was transmitted multiple times at different transmitter velocities relative to the receiver.

Performance Results for the Buzzards Bay Experiment

Figure 6:
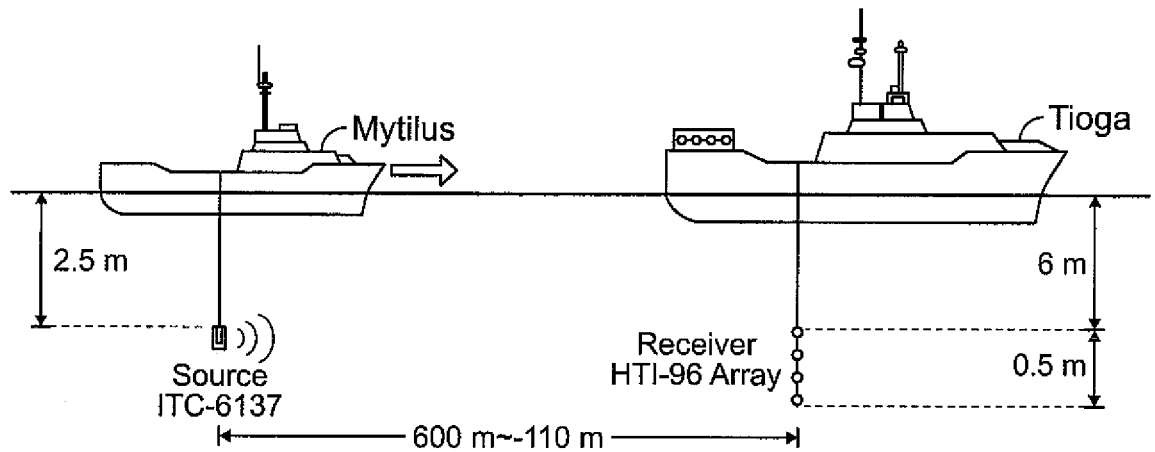
FIG. 6 depicts the configuration for an experimental operation according to the present disclosure (Buzzards Bay, Mass. experiment; "the Buzzards Bay experiment").

An experiment was conducted at Mudhole, Buzzards Bay, Mass., in which the transmitter was located at a water depth of about 2.5 meters and the receiver for the experiment consisted of a 0.5 m long, four-element vertical array submerged at a water depth of about 6 meters. The transmitter was mounted relative to the arm of a first ship (the "Mytilus"), and the receiver array was mounted relative to the arm of a second ship (the "Tioga"). OFDM signals were transmitted as the Mytilus moved towards the Tioga, starting at a distance of 600 m. In the experiment, the Mytilus continued to transmit as it passed by the Tioga, and up until approximately 100 m in the opposing direction. The experimental configuration, as described, is depicted in FIG. 6.

Figure 7:
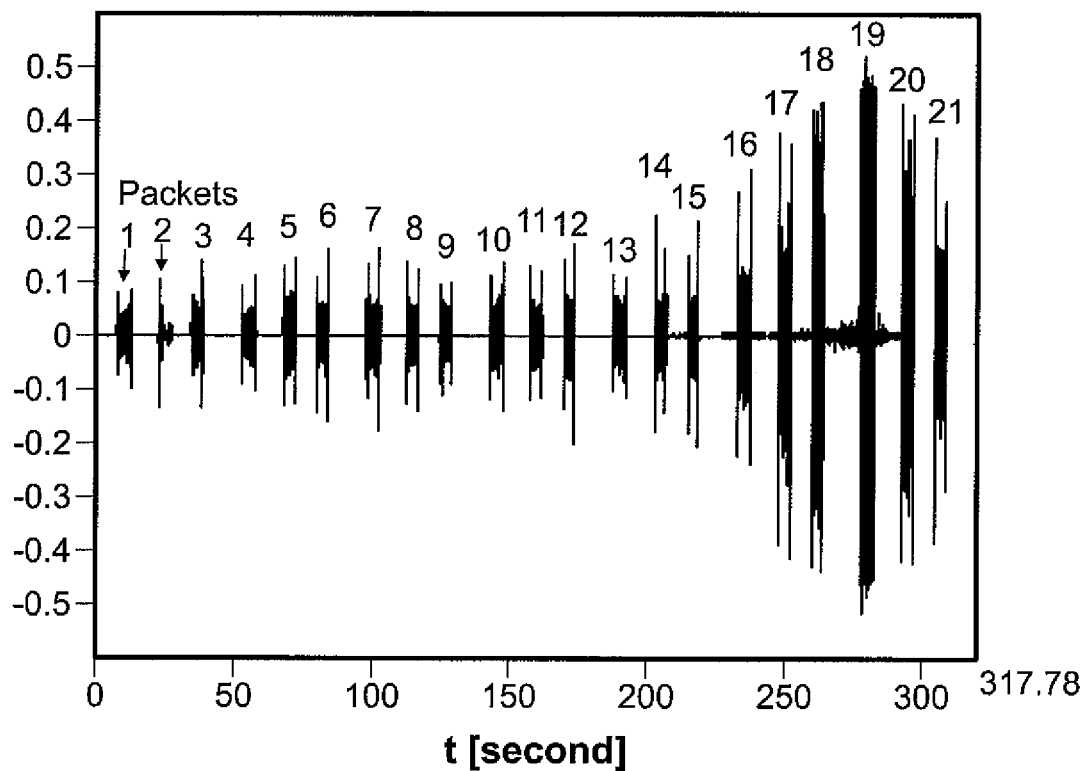
FIG. 7 depicts the received signal for the Buzzards Bay experiment

The received signal was directly analog-to-digital (A/D) converted. FIG. 7 depicts a signal received for one receiving element. The received signal contains seven (7) data bursts corresponding to 21 data packets. Several direct observations may be made:

1) The received signal power increases through packet 19, and decreases thereafter. Thus, the transmitter was moving towards the receiver before packet 19 and moving away from the receiver after packet 19.
2) A sudden increase in noise occurs around packet 19. This noise resulted from the proximity of the Mytilus to the Tioga at that time.
3) The second data packet was severely distorted. The reason is unclear.

Additionally, data processing of the received signal reveals that the signal was compressed prior to packet 19, and dilated thereafter. This is once again a function of the transmitter initially moving towards the receiver and then moving away from the receiver.

Numerical results and comparisons based on the Buzzards Bay experiment are presented herein. Further results and comparisons are available and are incorporated herein by reference (see B. Li, S. Zhou, and L. Freitag, "Performance Results for the Underwater OFDM Experiment at Mudhole, Buzzards Bay, Dec. 15, 2006," Technical Report, UCONN-WCRL-TR-2007-01, available at: http://www.engr.uconn.edu/~shengli/UCONN-WCRL-TR-2007-01.pdf.

Doppler Scale Estimation for the Buzzards Bay Experiment

Figure 21:
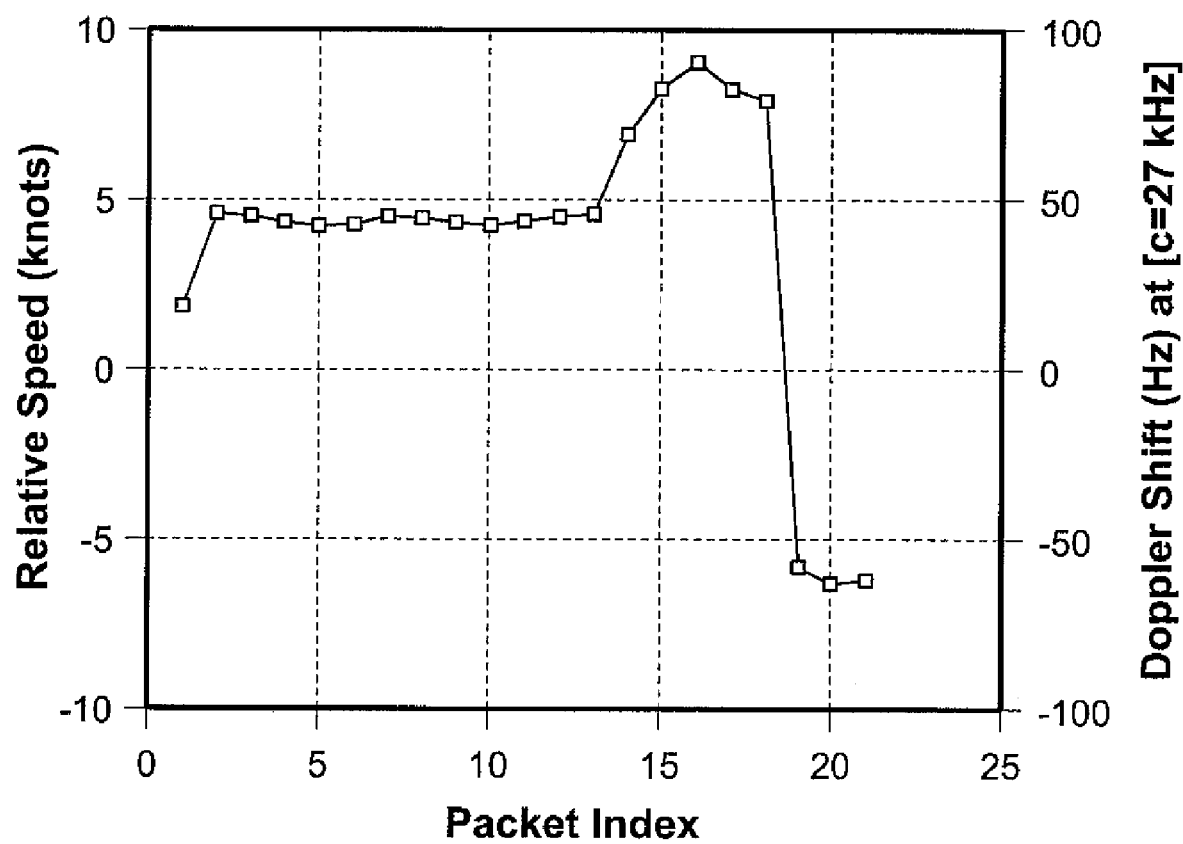
FIG. 21 depicts a coarse estimate of the relative speed and the Doppler shift at $f_c$=27 kHz estimated from the signal in FIG. 7.

As depicted in FIG. 7, the transmitted signal for the Buzzards Bay experiment consisted of 21 transmitted packets. Equation (22) may be used to estimate the Doppler scale for each packet individually. Based on each Doppler scale â, the relative speed between the transmitter and the receiver is estimated as $\hat{v}=\hat{a}\cdot c$, with a nominal sound speed of c=1500 m/s. The Doppler shift at the carrier frequency is roughly $\hat{a}f_c$, as shown in Table IV (below). FIG. 21 depicts a coarse estimate of the relative speed and the Doppler shift at $f_c$=27 kHz (for element 1).

TABLE IV

COARSE ESTIMATION OF RELATIVE SPEED AND DOPPLER SHIFTS FOR ELEMENT 1.

| Packet | Doppler shift due to to scaling at $f_c$ (Hz) | Relative speed (knots) |
|---|---|---|
| 1 | −17.34 | −1.86 |
| 2 | −42.49 | −4.58 |
| 3 | −41.87 | −4.52 |
| 4 | −40.29 | −4.35 |
| 5 | −39.37 | −4.25 |
| 6 | −39.69 | −4.27 |
| 7 | −41.91 | −4.52 |
| 8 | −41.62 | −4.48 |
| 9 | −40.34 | −4.35 |
| 10 | −39.68 | −4.26 |
| 11 | −40.60 | −4.38 |
| 12 | −41.79 | −4.50 |
| 13 | −42.45 | −4.58 |
| 14 | −64.04 | −6.91 |
| 15 | −76.98 | −8.30 |
| 16 | −83.95 | −9.04 |
| 17 | −76.68 | −8.26 |
| 18 | −73.34 | −7.90 |
| 19 | 53.96 | 5.82 |
| 20 | 58.34 | 6.29 |
| 21 | 57.15 | 6.17 |

Table IV and FIG. 21 indicate that the resulting Doppler shifts were much larger than the OFDM subcarrier spacing. For example, for $\hat{v}$=−8.30 knots, the Doppler shift was −76.98 Hz at $f_c$=27 kHz, while the subcarrier spacing was only $\Delta_f$=23.44, 11.72, 5.86 Hz for K=512, 1024, 2048, respectively. Thus, rescaling the waveform (even coarsely) is a necessary step to compensate for the non-uniformity of Doppler shifts in the frequency domain.

High Resolution Residual Doppler Estimation for the Buzzards Bay Experiment

Figure 8:
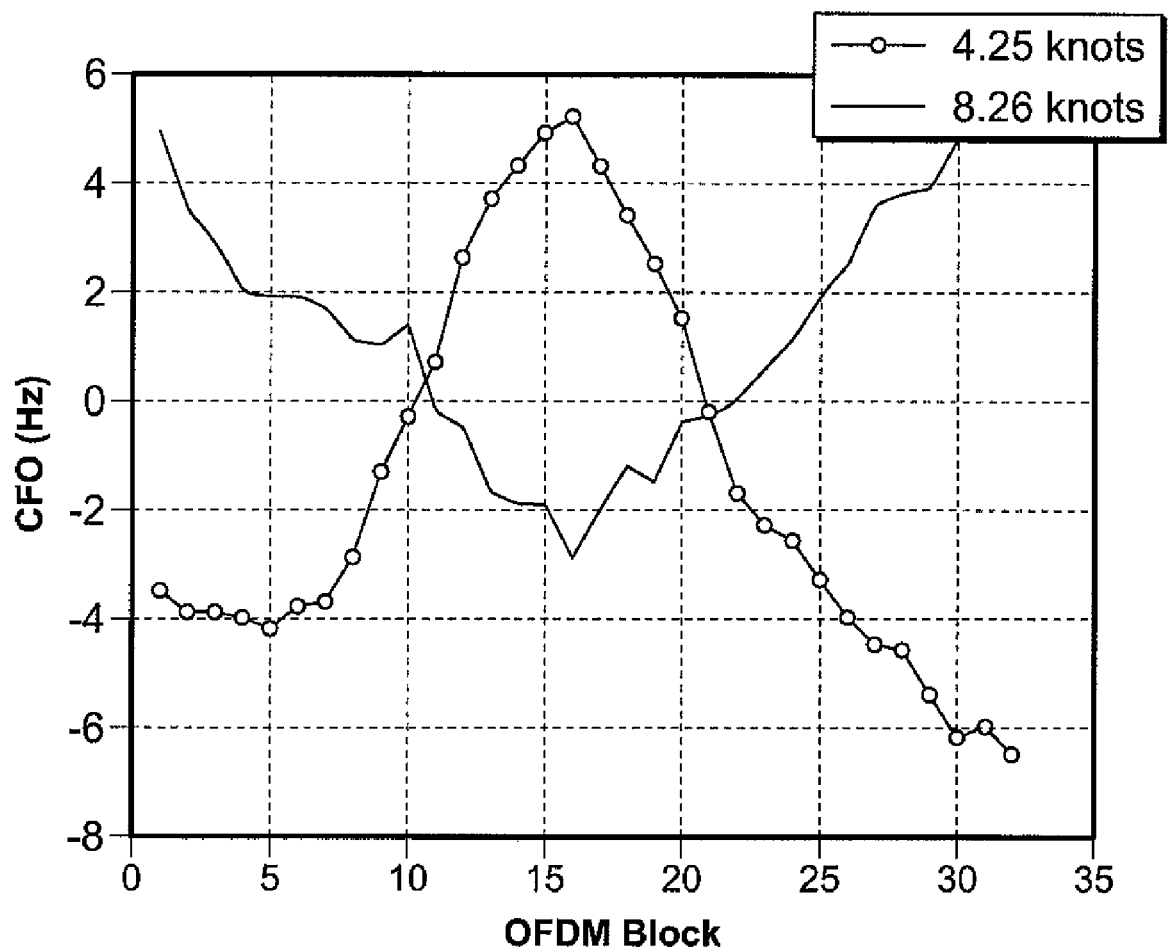
FIGS. 8 and 9 depict (i) estimated residual Doppler, and (ii) channel estimates, respectively, for packet 5 (at 4.25 knots) and packet 17 (at 8.26 knots) of the received signal in FIG. 7.

High-resolution CFO estimation was performed on a block-by-block basis, as previously detailed. FIG. 8 shows the CFO estimates for packets 5 and 17, respectively, where K=1024, and each packet has 32 OFDM blocks. The CFO changes roughly continuously from block to block; however, the change cannot be regarded as constant. The CFO estimate is on the order of half of the subcarrier spacing. Thus, without fine tuning of the CFO, receiver performance would deteriorate considerably. Joint Doppler scale and CFO estimation based on null subcarriers was also tested. The performance improvement was marginal for this experiment.

Channel Estimation for the Buzzards Bay Experiment

Figure 9:
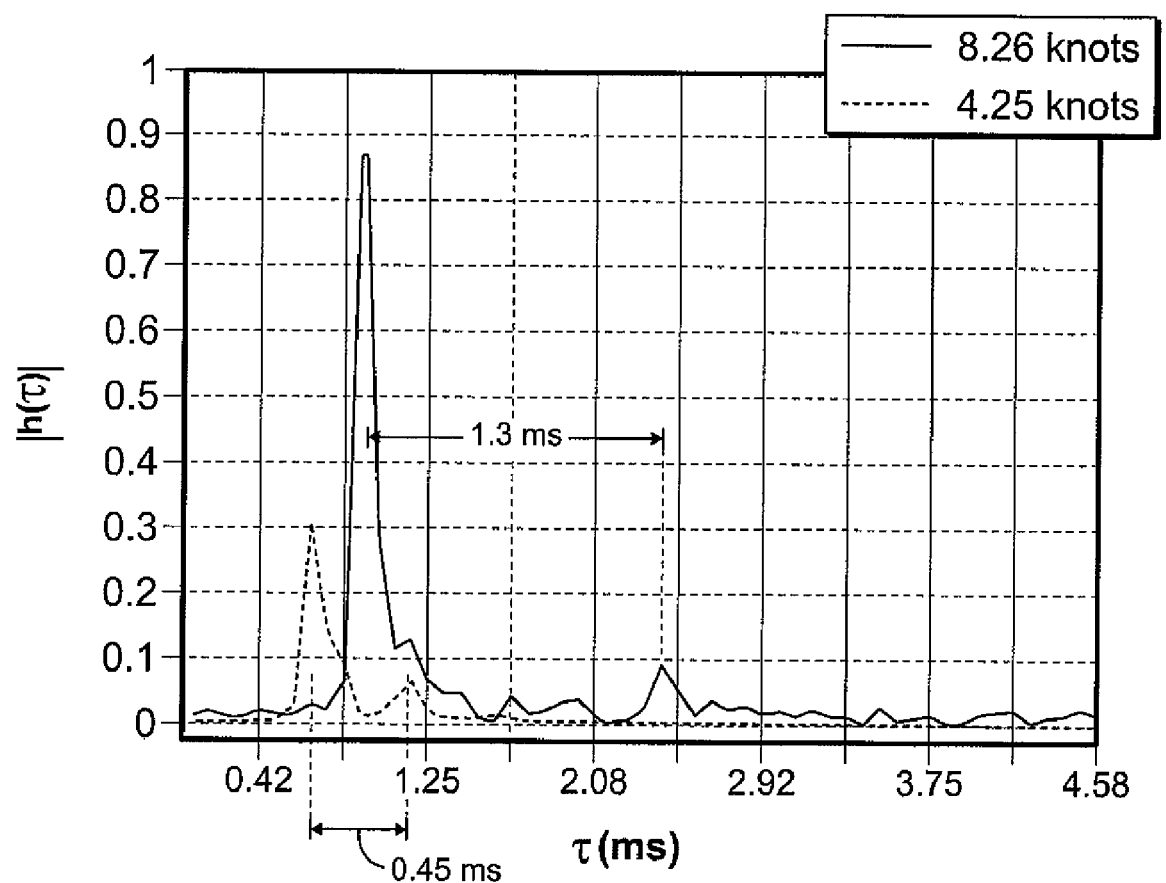

Channel estimation based on equi-spaced pilots was also tested during the Buzzards Bay Experiment. $N_p=K/4$ data were used as pilots. With reference now to FIG. 9, the estimated channels are depicted for two (2) cases as the Mytilus was moving toward the Tioga: (1) for a relative speed of 4.25 knots (packet 5), and (2) for a relative speed of 8.26 knots (packet 17). The channel impulse response duration is about 4.58 ms. Also, the energy for packet 17 is higher than for packet 5. This matches the power profile discussed with reference to FIG. 7.

FIG. 9 indicates that there was a strong direct path between the transmitter and the receiver. FIG. 9 also indicates a strong second path between the transmitter and receiver. This second path is probably the result of a bottom bounce. In addition to these two relatively strong paths, there are other paths of lesser energy.

Uncoded BER Performance for the Buzzards Bay Experiment

Due to the large number of blocks received on each of the four elements, only one subset of results (element 1) is considered herein. Uncoded BER performance results on a block by block basis for K=512, corresponding to packets 1,4,7,10, 13,16,19 are provided according to Table V. For K=512, each packet consisted of 64 OFDM blocks.

Note that the uncoded BER results for K=1024 and K=2048 were similar to those for K=512. Based on Table V as well as the uncoded BER results for K=1024 and K=2048 (not provided herein), the following observations are advanced:

1. The tested receiver performed well without coding.
2. The number of erroneously detected bits was zero for low speeds, e.g., packet 1, and for stable speeds, e.g., packet 16.
3. The tested receiver is able to handle speeds up to 9.04 knots.
4. Several consecutive "bad" blocks were observed for packets 19 and 20 leading to large BER values. This is probably due to the fact that the transmitter passed by the receiver during the transmission of packets 19 and 20. Thus, the Doppler frequencies changed from negative to positive values; i.e. were not constant (the proposed approach assumes that relative speed is constant over a block). Also, the increased noise level from the proximity of the two ships may have contributed to poor receiver performance. These observations are supported by the fact that near perfect performance was restored for the transmission of packet 21.
5. A large number of errors are observed in blocks 11, 30, 31, and 32 of packet 2 (with K=1024). As discussed with reference to FIG. 7 this received packet was badly distorted, reason unknown.
6. A large number of errors are also observed in blocks 19 and 20 of packet 14. The reason for these errors is also unclear.

TABLE V

UNCODED BER FOR K = 512, ELEMENT 4. (I)

| | Packet | | | | | | |
|---|---|---|---|---|---|---|---|
| Block | 1 (−1.86 knots) | 4 (−4.35 knots) | 7 (−4.52 knots) | 10 (−4.26 knots) | 13 (−4.58 knots) | 16 (−9.04 knots) | 19 (5.82 knots) |
| ... | ... | ... | ... | ... | ... | ... | ... |
| 21 | 0 | 0 | 0.001 | 0.001 | 0.008 | 0 | 0.028 |
| 22 | 0 | 0 | 0.003 | 0.004 | 0.006 | 0 | 0.090 |
| 23 | 0 | 0 | 0.007 | 0.001 | 0 | 0 | 0.146 |
| 24 | 0 | 0 | 0.004 | 0 | 0.007 | 0 | 0.612 |
| 25 | 0 | 0 | 0.003 | 0.003 | 0.007 | 0 | 0.639 |
| 26 | 0 | 0 | 0.004 | 0.003 | 0.004 | 0 | 0.647 |
| 27 | 0 | 0 | 0.003 | 0.001 | 0 | 0 | 0.646 |
| 28 | 0 | 0 | 0.003 | 0.003 | 0.003 | 0 | 0.636 |
| 29 | 0 | 0 | 0 | 0.003 | 0.004 | 0 | 0.629 |
| 30 | 0 | 0 | 0 | 0.003 | 0.003 | 0 | 0.636 |
| 31 | 0 | 0 | 0.004 | 0.006 | 0.001 | 0 | 0.625 |
| 32 | 0 | 0 | 0.001 | 0.003 | 0 | 0 | 0.190 |
| 33 | 0 | 0 | 0.006 | 0.001 | 0.003 | 0 | 0.140 |
| 34 | 0 | 0 | 0.006 | 0.004 | 0.001 | 0 | 0.059 |
| 35 | 0 | 0 | 0.007 | 0.003 | 0.001 | 0 | 0.014 |
| ... | ... | ... | ... | ... | ... | ... | ... |
| Average over 64 blocks | 0 | $2.2 \times 10^{-4}$ | $2.5 \times 10^{-3}$ | $4.3 \times 10^{-3}$ | $1.4 \times 10^{-3}$ | 0 | $9.6 \times 10^{-2}$ |

Coded BER Performance for the Buzzards Bay Experiment

Figure 22:
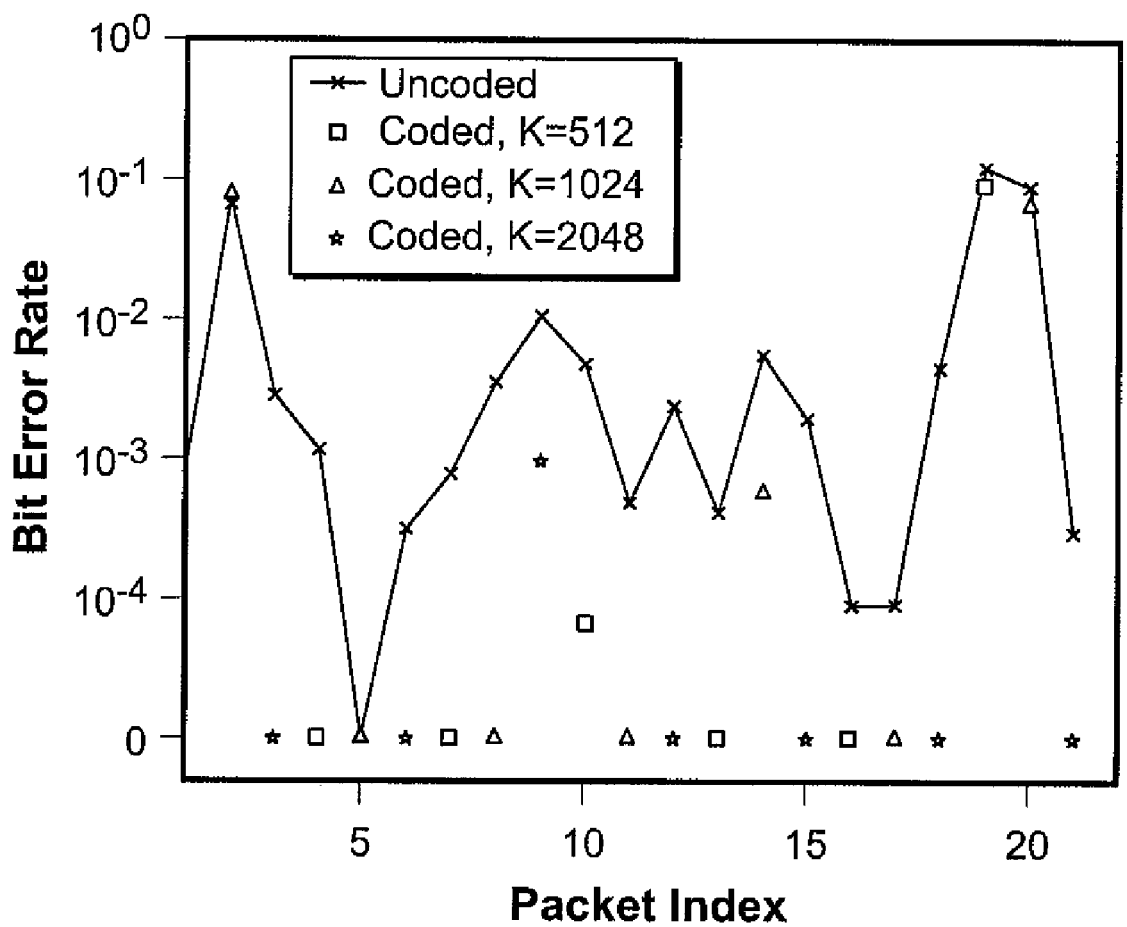
FIG. 22 depicts coded and uncoded BER results averaged over each packet of the signal in FIG. 7.
Figure 23:
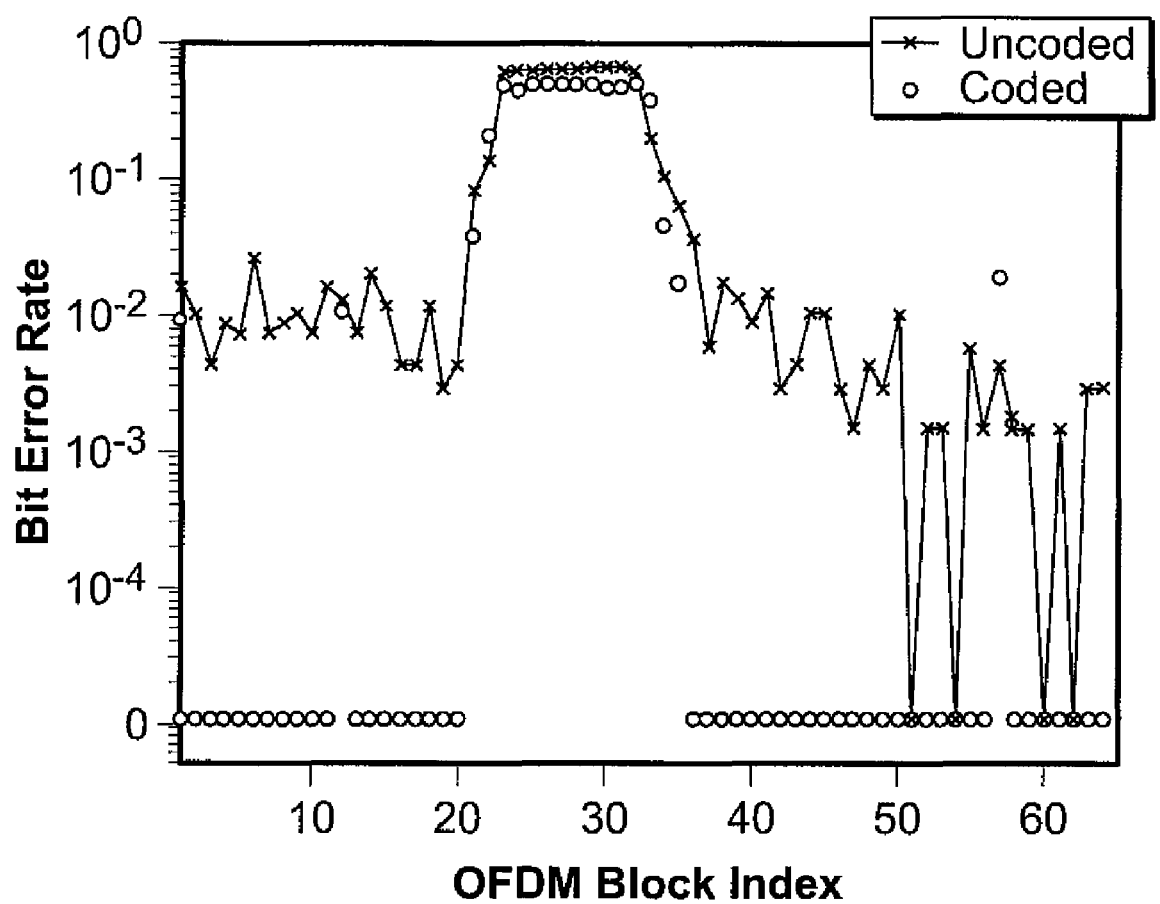
FIG. 23 depicts coded and uncoded BER results averaged over each block for packet 19 of the signal in FIG. 7.

As previously noted, all information was coded by a rate ⅔ convolutional code obtained by puncturing a rate ½ code. To test the coded performance, Viterbi algorithm (VA) processing was applied after OFDM demodulation. FIG. 22 compares coded and uncoded BER results averaged over each packet for one receiver (element 1). Note that packets 10 and 19 (K=512), packets 2, 14, and 20 (K=1024) and Packet 9 (K=2048) have decoding errors. FIG. 23 compares coded and uncoded BER results averaged over each block for packet 19, K=512 (element 1).

Partial coded BER performance results for receiving element 1 are provided according to Table VI:

TABLE VI

CODED BER FOR K = 512, ELEMENT 4. (I)

| Block | Packet 1 (−1.86 knots) | 4 (−4.35 knots) | 7 (−4.52 knots) | 10 (−4.26 knots) | 13 (−4.58 knots) | 16 (−9.04 knots) | 19 (5.82 knots) |
|---|---|---|---|---|---|---|---|
| 1, . . . , 21 | 0 | 0 | 0 | 0 | 0 | 0 | 0 |
| 22 | 0 | 0 | 0 | 0 | 0 | 0 | 0 |
| 23 | 0 | 0 | 0 | 0 | 0 | 0 | 0.0268 |
| 24 | 0 | 0 | 0 | 0 | 0 | 0 | 0.4896 |
| 25 | 0 | 0 | 0 | 0 | 0 | 0 | 0.4834 |
| 26 | 0 | 0 | 0 | 0 | 0 | 0 | 0.5351 |
| 27 | 0 | 0 | 0 | 0 | 0 | 0 | 0.5020 |
| 28 | 0 | 0 | 0 | 0 | 0 | 0 | 0.5103 |
| 29 | 0 | 0 | 0 | 0 | 0 | 0 | 0.4731 |
| 30 | 0 | 0 | 0 | 0 | 0 | 0 | 0.4628 |
| 31 | 0 | 0 | 0 | 0 | 0 | 0 | 0.4731 |
| 32 | 0 | 0 | 0 | 0 | 0 | 0 | 0.2995 |
| 33 | 0 | 0 | 0 | 0 | 0 | 0 | 0.04545 |
| 34 | 0 | 0 | 0 | 0 | 0 | 0 | 0 |
| 35, . . . , 64 | 0 | 0 | 0 | 0 | 0 | 0 | 0 |

As shown in Table VI, the number of bit errors for most blocks is zero. Overall, only a few blocks were found to have large coded BERs (coinciding with uncoded BERs above a certain threshold). More particularly: packet 2 (K=1024) has 22 out of 32 blocks in error after decoding (note that packet 2 was badly distorted as was seen in FIG. 7), packet 9 (K 2048) has 4 out of 16 blocks in error after decoding, packet 10 (K=512) has 2 out of 64 blocks in error after decoding, and packets 14 and 20 (K=1024) have 5 out of 32 block in error each, after decoding. Note that, except for packet 20 (four consecutive blocks in error at the end), the blocks in error are advantageously sporadic.

Referring now specifically to FIG. 23 and packet 19, it is notable that a majority of the blocks in error coincided with the transmitter passing by the receiver. This may be partially due to an increase in noise resulting from the boats' proximity to one another. Furthermore, the change in relative velocity and Doppler frequency from a positive to a negative during passing may have also contributed to the high error rate. Note, however, that with block-by-block processing, decoding errors in previous blocks have no impact on future blocks (see, e.g., FIG. 23). Hence, as demonstrated by the results, the receiver is robust to abrupt phase changes.

BER Performance with Multi-Channel Combining for Buzzards Bay Experiment

Figure 10:
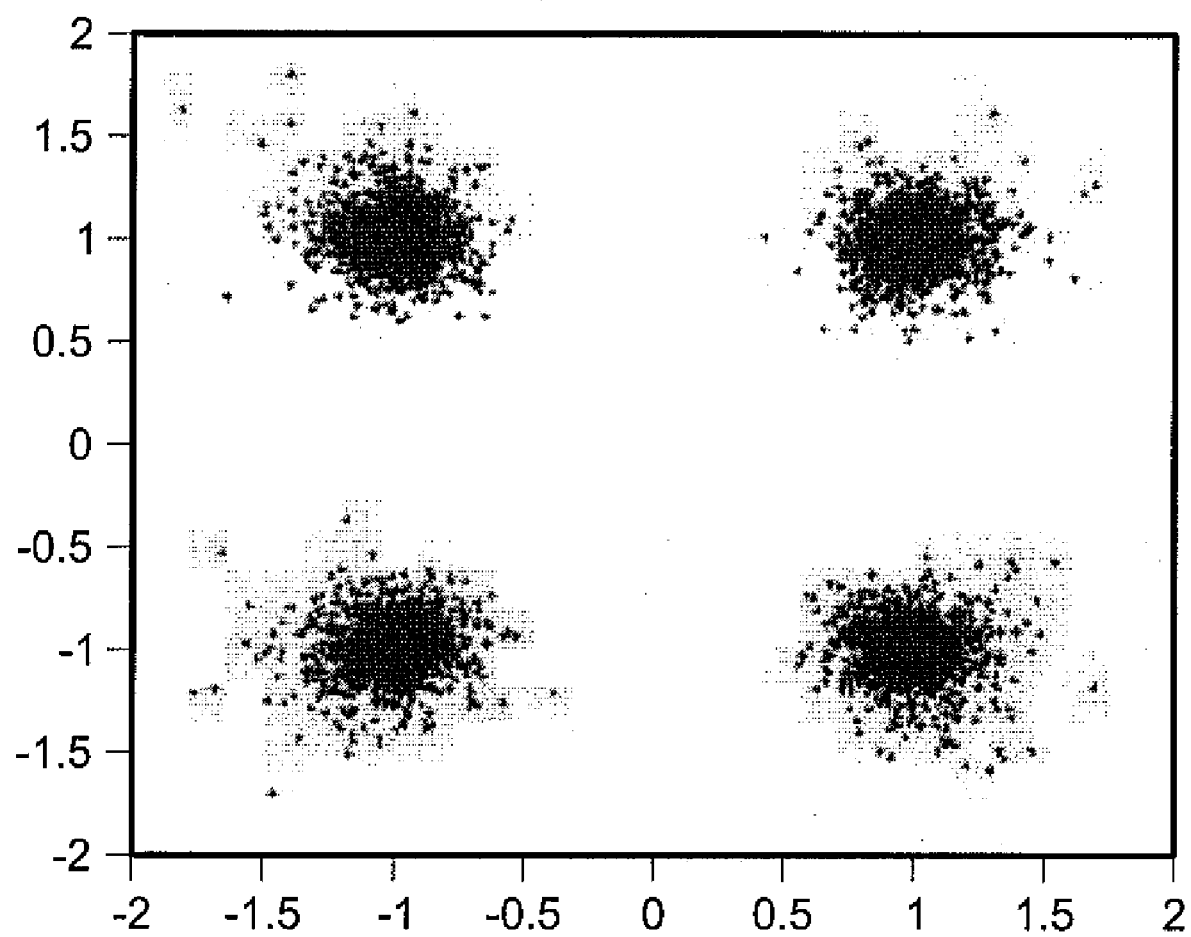
FIGS. 10 and 11 depict scatter diagrams for packet 11 of the received signal in FIG. 7 (k=1024, v=4.38 knots) (i) after multichannel reception combining (MRC), and (ii) for single-element reception (element 1), respectively.
Figure 11:
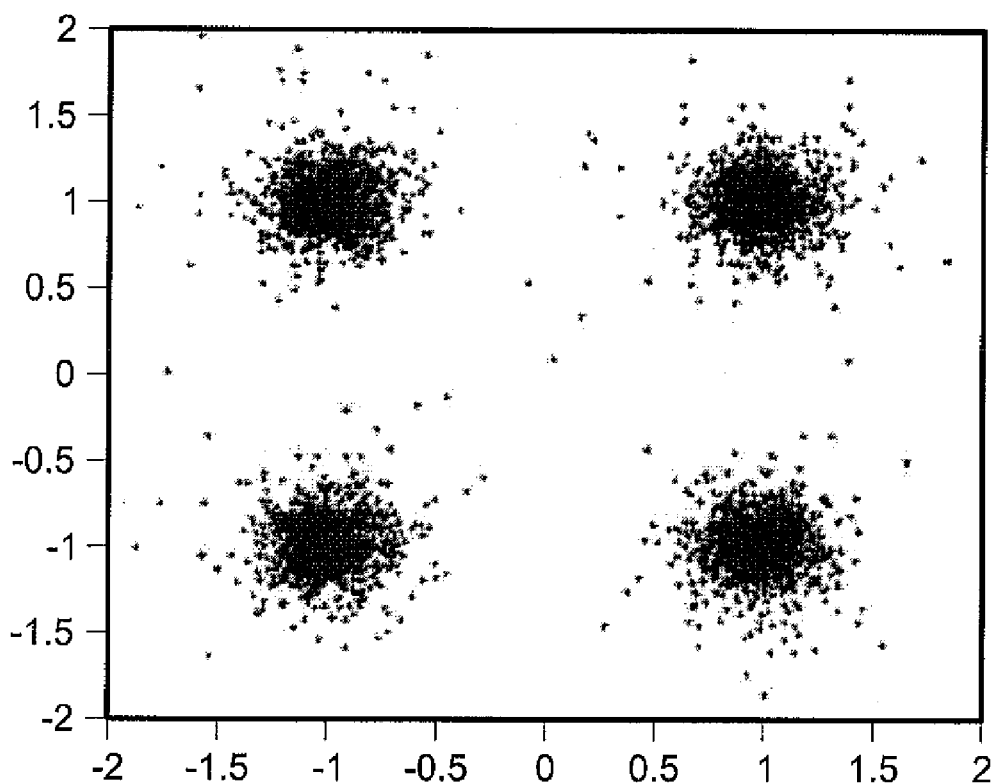
Figure 12:
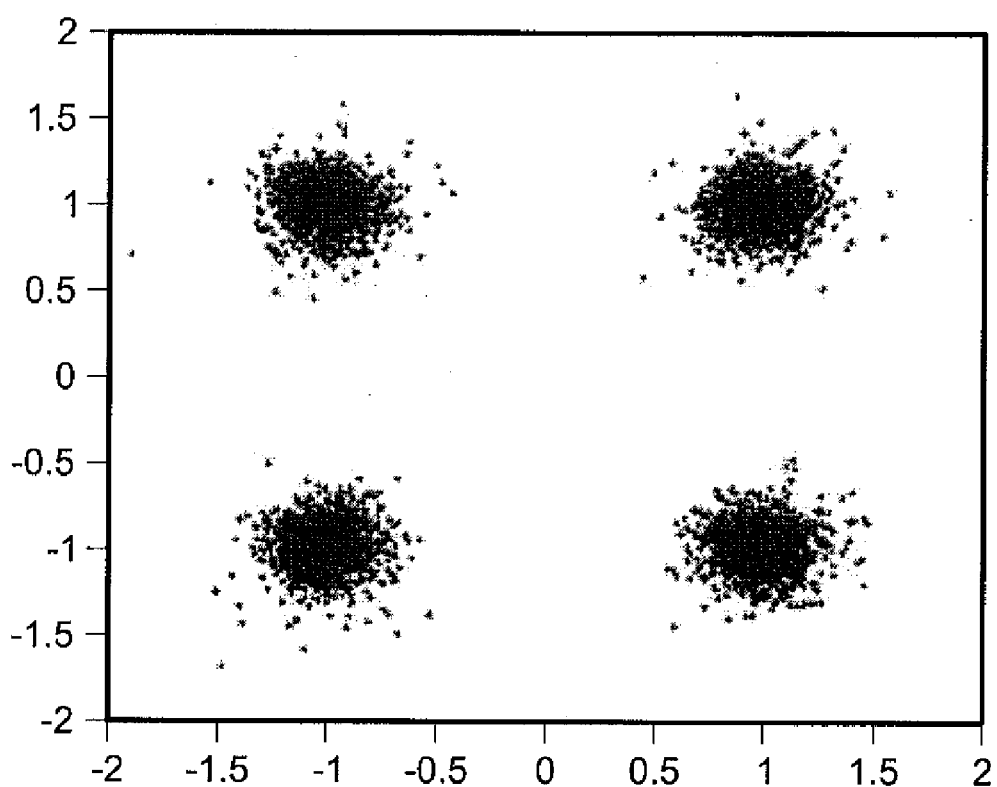
FIGS. 12 and 13 depict scatter diagrams for packet 17 of the received signal in FIG. 7 (k=0.1024, v=8.26 knots) (i) after MRC, and (ii) for single-element reception (element 1), respectively.
Figure 13:
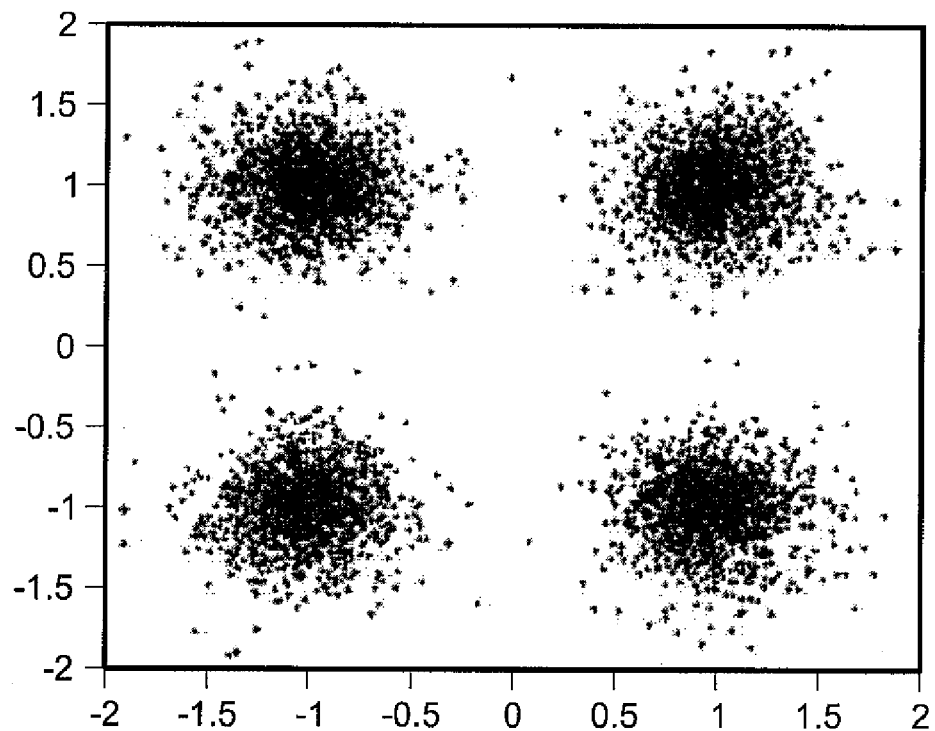

Similar to coding, multi-channel combining significantly improved receiver performance. For packet 11 (K=1024, v≈4.38 knots), the signals from four (4) receiver elements were combined using maximum-ratio-combining (MRC). FIG. 10 depicts the output scatter diagram for packet 11. Four clusters are clearly seen. The overall BER is zero. For comparison, the scatter diagram for single-channel reception (receiver element 1) of packet 11, under the same conditions, is depicted in FIG. 11. The clusters are discernibly larger and sparser than for MRC combination. Also, the estimated BER for single channel reception of packet 11 is $4.6 \times 10^{-4}$. Similarly, FIG. 12 and FIG. 13 depict scatter diagrams for packet 17 (K=1024 v≈8.26 knots): (i) after MRC, and (ii) for single-element reception (element 1), respectively. The overall BER for multi-channel reception is once again zero. By contrast, the estimated BER for single channel reception is $8.8 \times 10^{-5}$.

Performance Results for the Woods Hole Harbor Experiment

Figure 14:
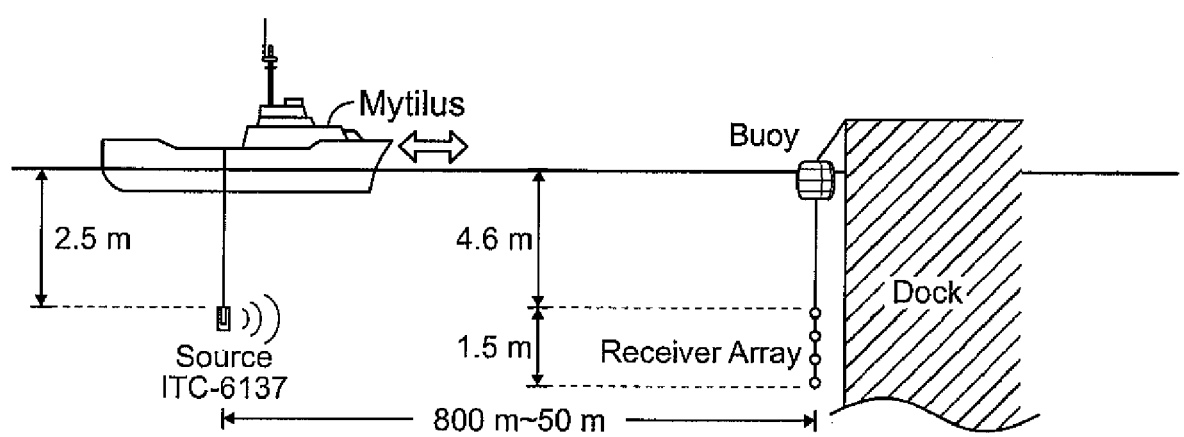
FIG. 14 depicts the configuration for a second experimental operation according to the present disclosure (Woods Hole Harbor, Mass. experiment; "the Woods Hole Harbor experiment").

A second experiment was conducted at Woods Hole Harbor, Mass. The signal was transmitted at a water depth of about 2.5 meters and received by a four-element vertical array with inter-element spacing 0.5 m, submerged at a water depth of about 6 meters. The transmitter was mounted on the arm of a first ship (the "Mytilus"), and the receiver array was mounted on a Buoy Transducer (the "Buoy") close to the dock. The signal was transmitted while the Mytilus moved away from the dock at a 90 degree angle, starting at a distance of 50 m from the dock and ending at a distance of approximately 800 m from the starting point. The signal was then transmitted a second time, with the Mytilus moving towards the dock instead. The experimental configuration, as described, is depicted in FIG. 14.

Figure 15:
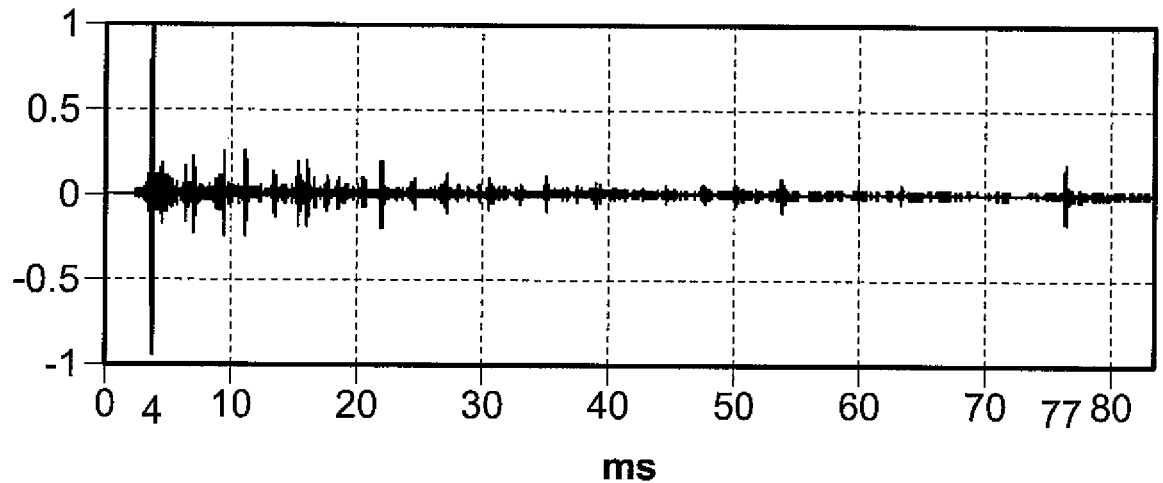
FIG. 15 depicts channel profiles obtained from linear frequency modulation (LFM) of the preamble for (a) the Woods Hole Harbor experiment, and (b) the Buzzards Bay experiment.
Figure 15:
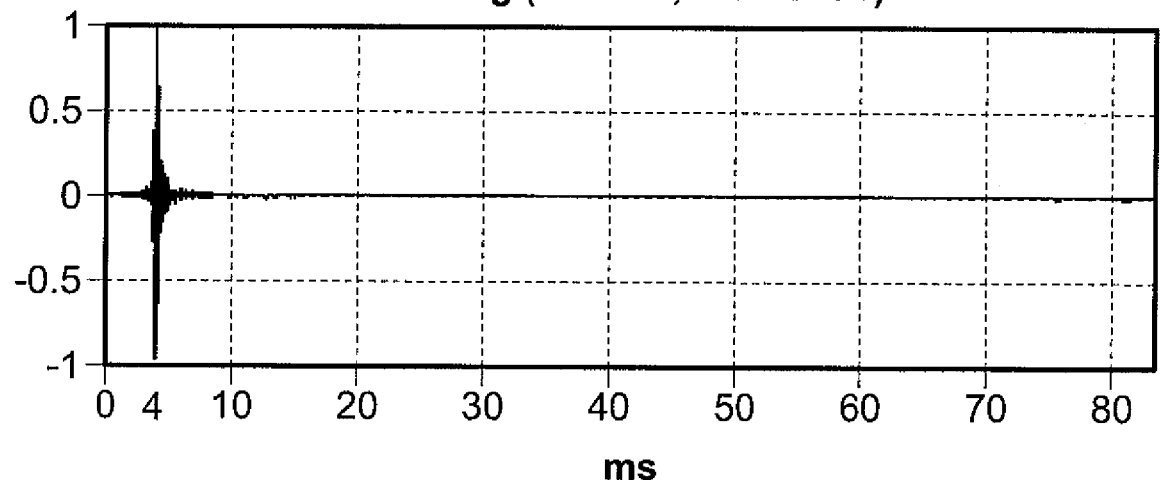

With reference now to FIG. 15 channel profiles obtained from linear frequency modulation (LFM) of the preamble for (a) the Woods Hole Harbor experiment, and (b) the Buzzards Bay experiment, are depicted for comparison. The channel condition for the Woods Hole Harbor Experiment was very bad with strong multipath signal propagation (the last strong path is evident at about 80 ms where the guard interval $T_g$=25 ms). The long delay spread is likely due to signal reflections off the piling near the dock.

Since the channel delay spread exceeded the guard interval, the transmitted signal suffered inter-block interference (IBI). While not tested herein, it is noted that a channel shortening approach may be used to reduce IBI prior to OFDM demodulation. See, e.g., R. K. Martin and C. R. Johnson, Jr., "Adaptive equalization: transitioning from single-carrier to multicarrier systems," IEEE Signal Processing Magazine, Vol. 22, No. 6, pp. 108-122, November 2005; J. Kleider and X. Ma, "Adaptive channel shortening equalization for coherent OFDM doubly selective channels," in Proc. of International Conference on Acoustics, Speech, and Signal Processing, Toulouse, France, May 15-19, 2006; and X. Ma, R. J. Baxley, J. Kleider, and G. T. Zhou, "Superimposed training for channel shortening equalization in OFDM," in Proc. of Milcom, October 2006.

For the Woods Hole Harbor experiment, all multipath returns after the guard interval were treated as additive noise resulting in a low signal-to-noise ratio (SNR). Nevertheless, with channel coding and multichannel reception, satisfactory performance was still achieved, further evidencing the robustness of the disclosed apparatus, systems and methods.

Only a portion of the numerical results and comparisons obtained in the Woods Hole Harbor experiment are presented herein. More particularly, numerical results for two representative data bursts are presented herein: (i) for when the Mytilus was moving away from the dock at a low speed of about 3 knots, and (ii) for when the Mytilus was moving towards the dock at a high speed of about 10 knots. As noted above, complete results and comparisons are available and are incorporated herein by reference. (See B. Li, S. Zhou, and L. Freitag, "Performance Results for the Underwater OFDM Experiment at Woods Hole Harbor, Dec. 1, 2006," Technical Report, UCONN-WCRL-TR-2007-02, available at: http://www.engr.uconn.edu/~shengli/UCONN-WCRL-TR-2007-02.pdf.

Doppler Scale Estimation for the Woods Hole Harbor Experiment

The Doppler scale for each packet was estimated as provided according to the present disclosure, Table VII depicts calculated Doppler shifts for packets transmitted at both 3 knots and 10 knots:

number of subcarriers. A possible explanation for this periodic effect is that since the Mytilus floats, its position is periodically effected by waves. Indeed, such an effect would presumably be more pronounced at low speeds than at high speeds.

5) Note that fewer null subcarriers are available for K=512 than for K=1024 or K=2048. Thus, CFO estimation for K=512 is more affected by the noise realizations. As K increases, a greater number of null subcarriers leads to better noise averaging as clearly depicted in FIGS. 16-18 (as K increases, the CFO curves smooth out).

Channel Estimation for the Woods Hole Harbor Experiment

Figure 19:
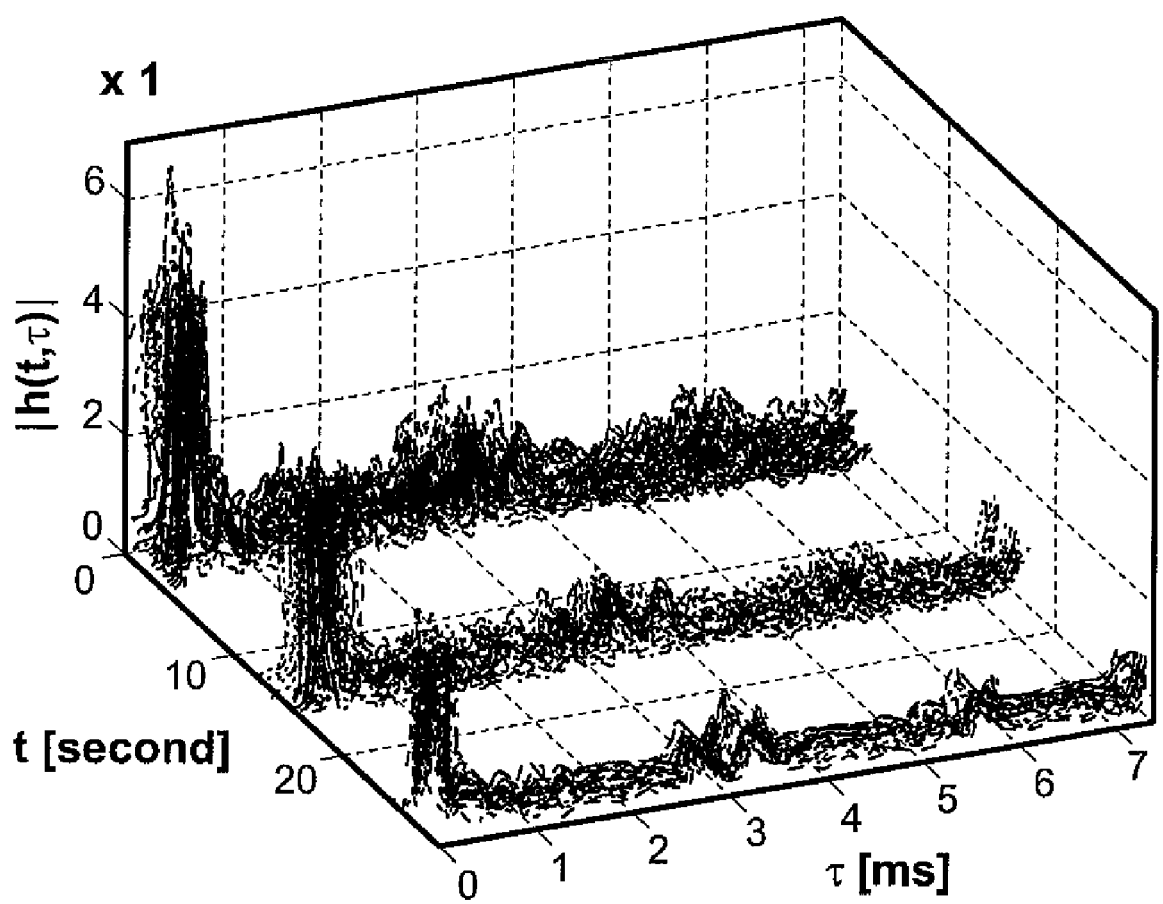
FIGS. 19 and 20 depict channel estimates for packets 1-3 of FIGS. 16-18 for (i) low speeds (2.9 knots) and (ii) high speeds (10.3 knots), respectively.
Figure 20:
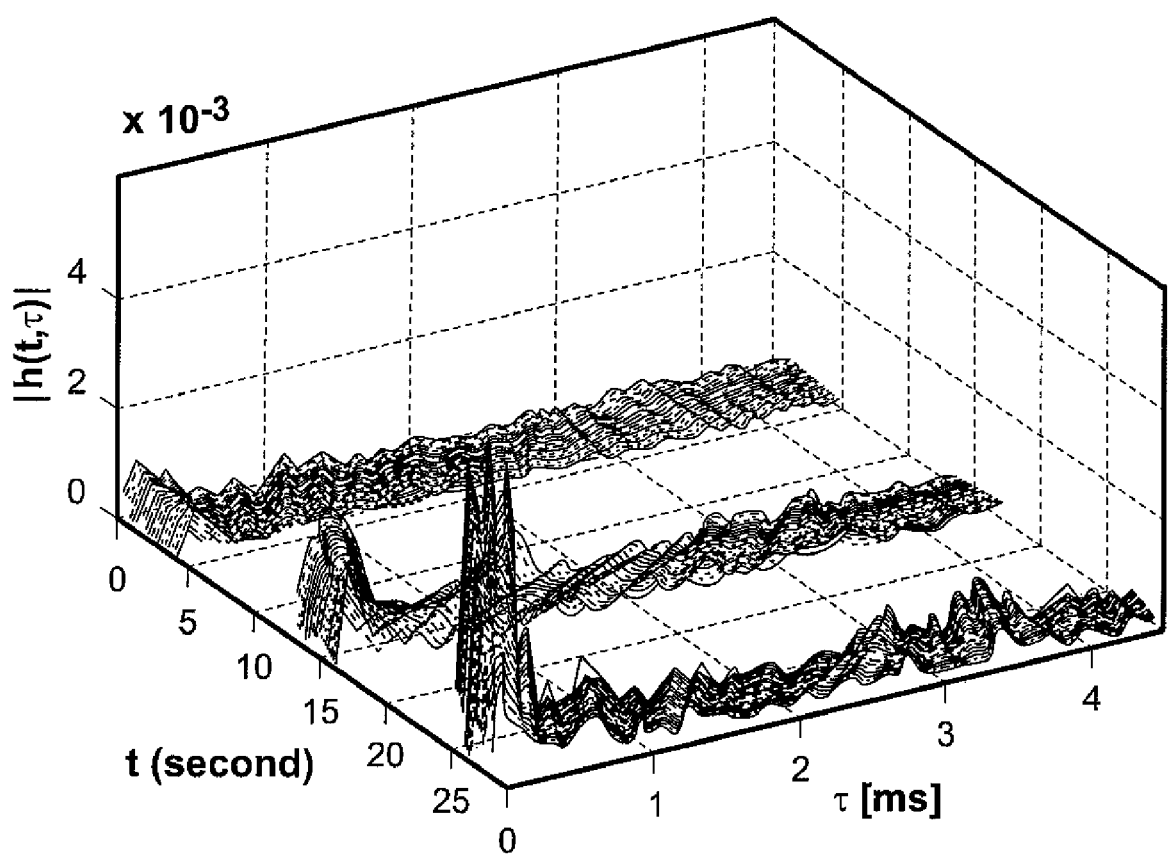

With reference now to FIGS. 19-20, channel estimates for low speed (3 knot) and high speed (10 knot) cases are depicted, respectively. Several stable paths are observed wherein the signal delay does not vary with the location and/or speed of the transmitter, e.g., at around 3 ms (this path is best interpreted as the first reflected path from the dock).

BER Performance for the Woods Hole Harbor Experiment

Due to the large number of blocks received on each of the four elements, only a subset of the results is presented herein. In particular, the results for packet 3, K=2048 are presented for both high and low speeds. For K=2048, each packet consists of 16 OFDM blocks. Similar results were obtained for other values of K (not depicted).

Figure 24:
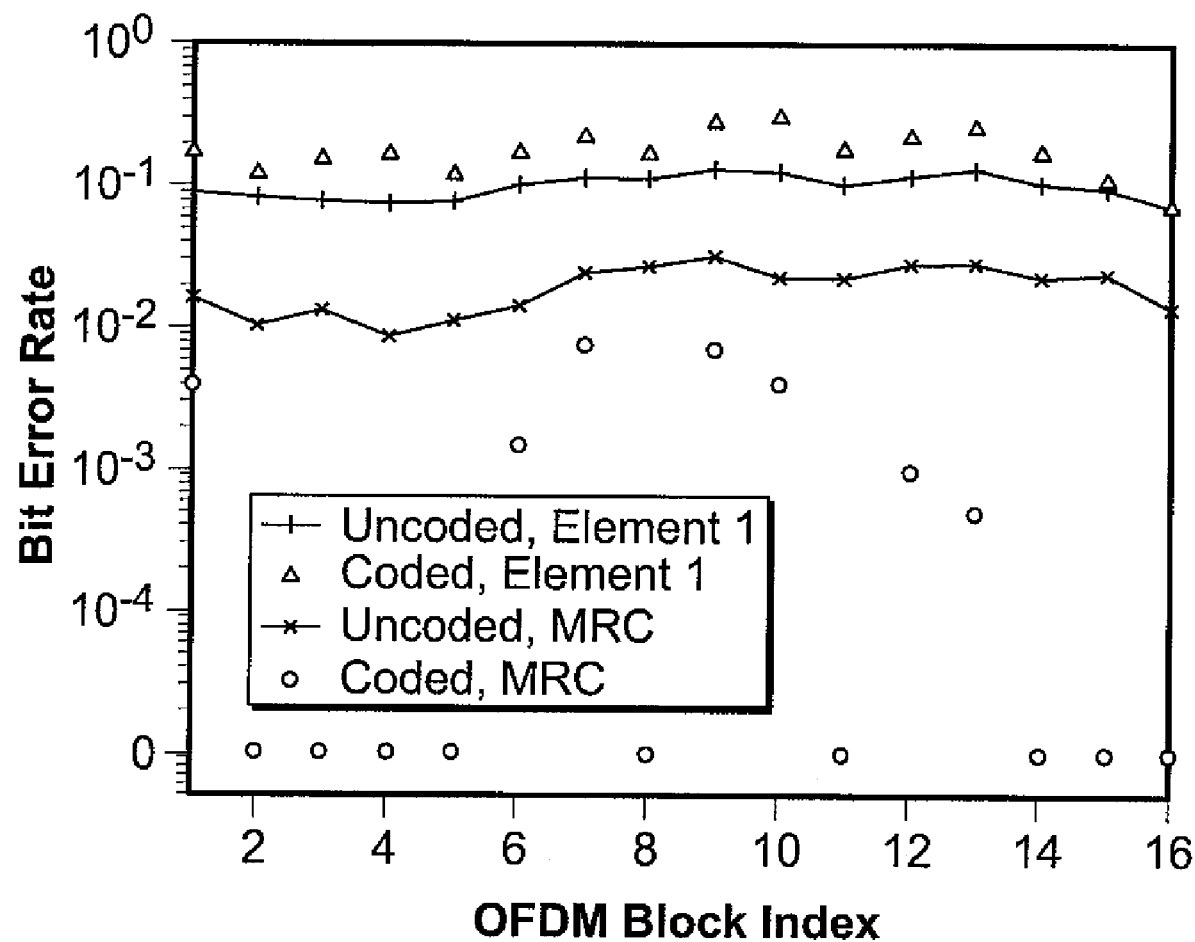
FIGS. 24 and 25 depict BER performance results for packet 3 (K=2048) of the received signal for the Woods Hole Harbor experiment at low speeds (3 knots) and at high speeds (10 knots), respectively.
Figure 25:
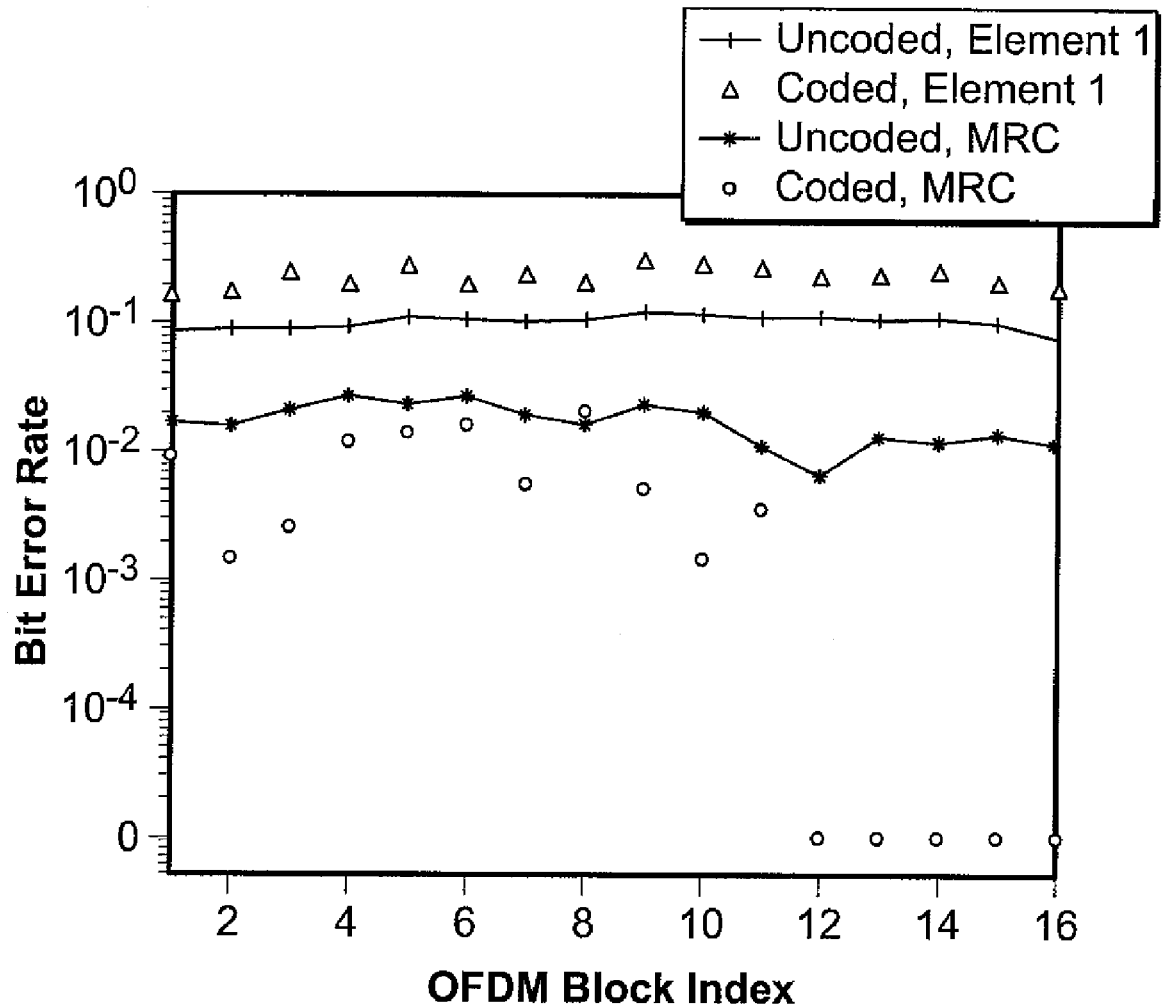

Since channel conditions were particularly severe, both coding and multi-channel combining were employed to improve BER performance. The second receiving element exhibited poor reception quality and was not used. Therefore, only three receiving elements were used for multi-channel combination. FIGS. 24-25 and Tables VIII-IX compare uncoded single channel, coded single-channel, uncoded multichannel and coded multichannel BER performance results

TABLE VII

COARSE ESTIMATION OF DOPPLER SHIFT AND RELATEVE SPEED FOR ELEMENT 1.

| the 3-knot case Packet | Doppler shift due to scaling at $f_c$ (Hz) | Relative speed (knots) | the 10-knot case Packet | Doppler shift due to scaling at $f_c$ (Hz) | Relative speed (knots) |
|---|---|---|---|---|---|
| 1 (K = 512) | 23.84 | 2.56 | 1 (K = 512) | −91.49 | −9.86 |
| 2 (K = 4024) | 21.30 | 2.29 | 2 (K = 1024) | −87.88 | −9.47 |
| 3 (K = 2048) | 24.06 | 2.60 | 3 (K = 2048) | −96.03 | −10.36 |

The Doppler shifts at $f_c$=27 kHz are very large for both cases. For the 3 knot case (the low-speed case), the Doppler shift is on the order of the OFDM subcarrier spacing, e.g. up to 23.84 Hz for K=512. By contrast, the Doppler shift for the 10 knot case (the high-speed case) is much greater than the subcarrier spacing. Hence, re-scaling the waveform (even coarsely) is a necessary step to reduce the Doppler effect nonuniformly in the frequency domain.

High Resolution Residual Doppler Estimation for Woods Hole Harbor Experiment

Figure 16:
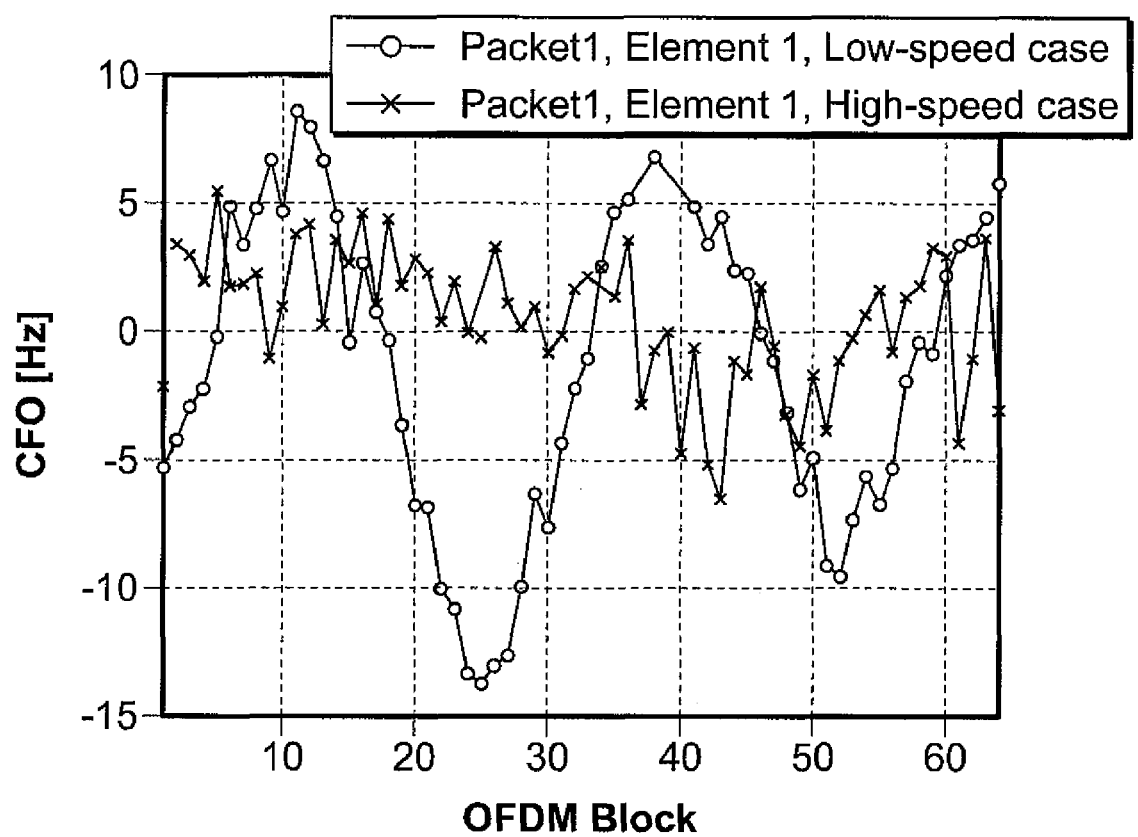
FIGS. 16-18 depict estimated residual Doppler both at low speeds (2.9 knots) and high speeds (10.3 knots) for (i) packet 1 (k=512, 64 OFDM blocks) (ii) packet 2 (k=1024, 32 OFDM blocks), and (iii) packet 3 (k=2048, 16 OFDM blocks), respectively, of the received signal for the Woods Hole Harbor experiment.
Figure 17:
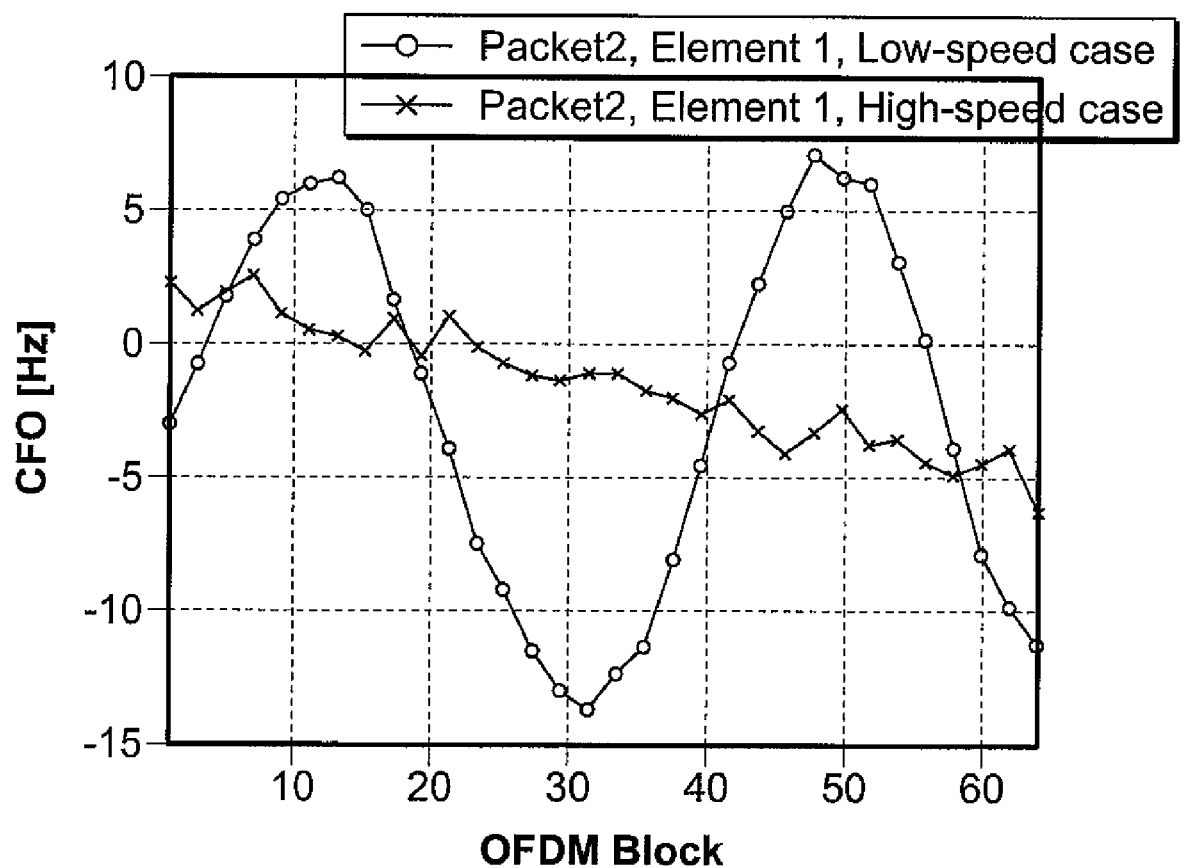
Figure 18:
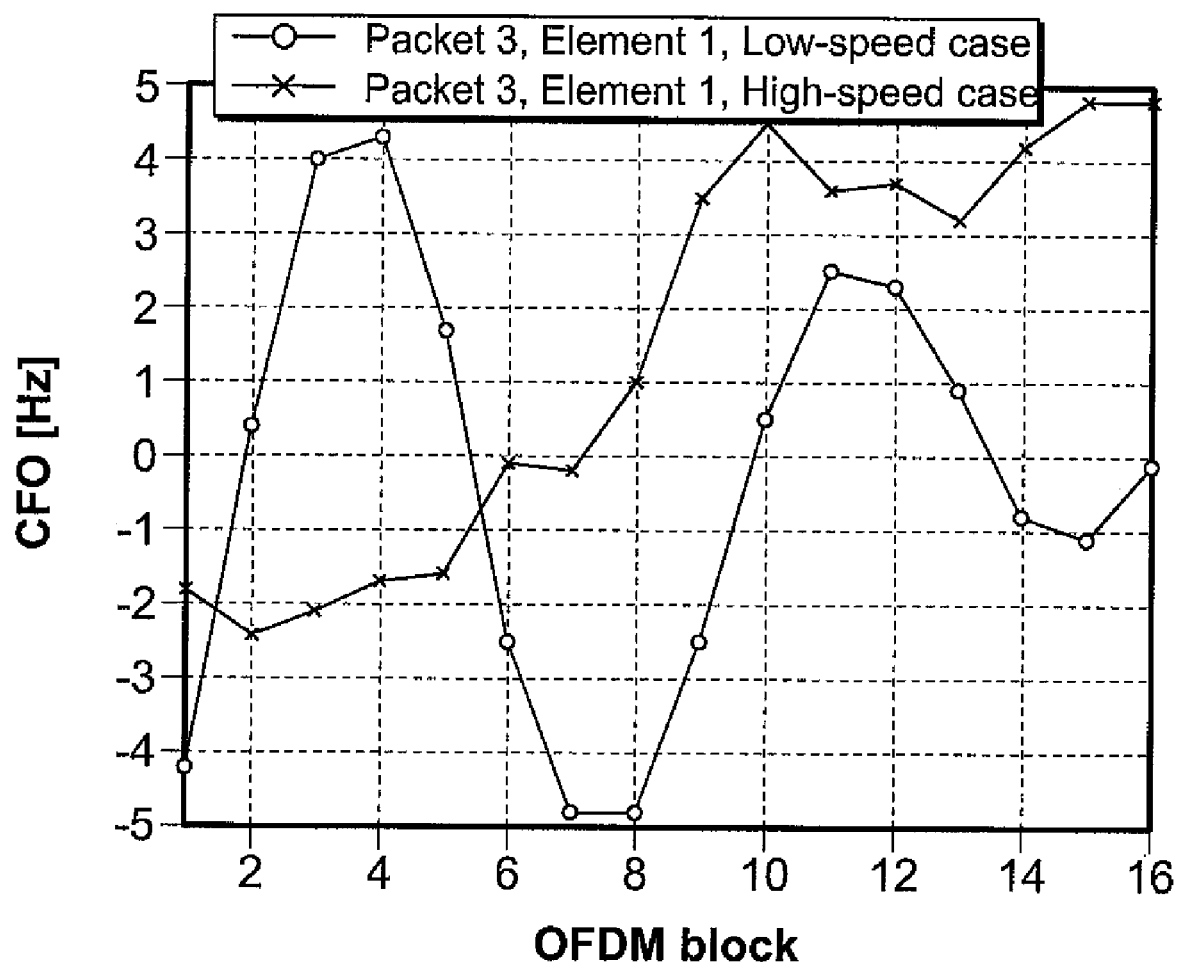

With reference now to FIGS. 16-18, the CFO estimation for packets 1, 2 and 3 (receiving element 1), respectively, are depicted. The following observations are made:

1) CFO changes from block to block smoothly, but cannot be regarded as constant.
2) The residual CFO effect cannot be neglected.
3) The CFO estimates are on the order of half of the subcarrier spacing for the low speed case.
4) The CFO changes periodically over time for the low-speed case. The period is the same irrespective of the for packet 3 (K=2048) at low speeds (3 knots) and at high speeds (10 knots), respectively.

TABLE VIII

BER PERFORMANCE OF THE LOW SPEED CASE (ABOUT 2.60 KNOTS) FOR PACKET 3, K = 2048.

| Block | Uncoded, element 1 | Coding, element 1 | MRC | MRC + coding |
|---|---|---|---|---|
| 1 | 0.0962 | 0.1725 | 0.0169 | 0.0041 |
| 2 | 0.0853 | 0.1235 | 0.0105 | 0 |
| 3 | 0.0804 | 0.1544 | 0.0137 | 0 |
| 4 | 0.0755 | 0.1710 | 0.0088 | 0 |
| 5 | 0.0790 | 0.1204 | 0.0112 | 0 |
| 6 | 0.1036 | 0.1741 | 0.0144 | 0.0015 |
| 7 | 0.1159 | 0.2268 | 0.0246 | 0.0077 |
| 8 | 0.1152 | 0.1725 | 0.0274 | 0 |
| 9 | 0.1348 | 0.2867 | 0.0323 | 0.0072 |
| 10 | 0.1306 | 0.3104 | 0.0228 | 0.0041 |
| 11 | 0.1067 | 0.1772 | 0.0228 | 0 |

TABLE VIII-continued

BER PERFORMANCE OF THE LOW SPEED CASE (ABOUT 2.60 KNOTS) FOR PACKET 3, K = 2048.

| Block | Uncoded, element 1 | Coding, element 1 | MRC | MRC + coding |
|---|---|---|---|---|
| 12 | 0.1222 | 0.2231 | 0.0288 | 0.0010 |
| 13 | 0.1334 | 0.2645 | 0.0291 | 0.0005 |
| 14 | 0.1071 | 0.1736 | 0.0228 | 0 |
| 15 | 0.0980 | 0.1136 | 0.0249 | 0 |
| 16 | 0.0727 | 0.0723 | 0.0140 | 0 |
| Average | 0.1035 | 0.1835 | 0.0203 | 0.0016 |

TABLE IX

BER PERFORMANCE OF THE HIGH SPEED CASE (ABOUT 10.36 KNOTS) FOR PACKET 3, K = 2048.

| Block | Uncoded, element 1 | Coding, element 1 | MRC | MRC + coding |
|---|---|---|---|---|
| 1 | 0.0881 | 0.1591 | 0.0172 | 0.0093 |
| 2 | 0.0913 | 0.1668 | 0.0162 | 0.0015 |
| 3 | 0.0899 | 0.2340 | 0.0211 | 0.0026 |
| 4 | 0.0962 | 0.1921 | 0.0274 | 0.0119 |
| 5 | 0.1148 | 0.2701 | 0.0239 | 0.0145 |
| 6 | 0.1085 | 0.1932 | 0.0277 | 0.0165 |
| 7 | 0.1039 | 0.2278 | 0.0197 | 0.0057 |
| 8 | 0.1085 | 0.1973 | 0.0165 | 0.0207 |
| 9 | 0.1264 | 0.2939 | 0.0239 | 0.0052 |
| 10 | 0.1215 | 0.2784 | 0.0204 | 0.0015 |
| 11 | 0.1152 | 0.2598 | 0.0112 | 0.0036 |
| 12 | 0.1183 | 0.2242 | 0.0067 | 0 |
| 13 | 0.1110 | 0.2304 | 0.0133 | 0 |
| 14 | 0.1152 | 0.2454 | 0.0123 | 0 |
| 15 | 0.1050 | 0.2009 | 0.0140 | 0 |
| 16 | 0.0804 | 0.1823 | 0.0119 | 0 |
| Average | 0.1059 | 0.2222 | 0.0177 | 0.0058 |

Based on the results depicted in FIGS. 24-25, and Tables VIII and IX for K=2048 as well as results for K=512 and K=1024 (not provided herein), the following observations are made:

1) BER performance is poor for both uncoded single-channel and uncoded multi-channel signal processing (on the order of $10^{-1}$ and $10^{-2}$, respectively).
2) Coding does not adequately improve performance for single-channel reception.
3) BER performance is acceptable for coded MRC (compare uncoded MRC where BER results averaged $2\times10^{-2}$ (at 3 knots) and $1.7\times10^{-2}$ (at 10 knots) with coded MRC where BER results averaged $1.6\times10^{-3}$ (at 3 knots) and $5.8\times10^{-3}$ (at 10 knots)).
4) For coded MRC reception, a larger K improves performance. When K increases, the effect of channel variation within one OFDM block becomes more severe. This increased severity is countered by the increased number of null subcarriers and pilot subcarriers which result in better CFO and channel estimation against noise. For the particular data set obtained during the Woods Hole Harbor experiment, the noise effect outweighs the channel-variation effect, contributing to the poor BER results. Note that in the exemplary embodiment presented, the sampling rate is fixed for all values of K. Thus, the discrete-time channel has approximately the same number of taps regardless of K.
5) The results demonstrate the robustness of the disclosed apparatus, systems and methods, wherein acceptable performance was achieved even with a delay spread much larger than the OFDM guard interval. Note that a stronger channel code, e.g., a nonbinary low-density-parity-check (LDPC) code (see B. Li, S. Zhou, M. Stojanovic, L. Freitag, J. Huang, and P. Willett, "MIMO-OFDM over an underwater acoustic channel," in Proc. of MTS/IEEE OCEANS conference, Vancouver, BC, Canada, Sep. 29-Oct. 4, 2007), may considerably improve the BER performance.

The apparatus, systems and methods of the present disclosure are typically implemented with conventional processing technology. Thus, programming is typically provided for operation on a processor, such programming being adapted to perform the noted operations for processing an acoustic signal in the manner disclosed herein. The processor may communicate with data storage and/or other processing elements, e.g., over a network, as is well known to persons skilled in the art. Thus, in exemplary implementations of the present disclosure, programming is provided that is adapted to mitigate Doppler distortions in a received multi-carrier based underwater acoustic (UWA) signal, such that a UWA signal that is received in a distorted condition may be processed to alleviate such distortions. Processing according to the disclosed programming may be adapted, for example, to compensate for the distorted condition and restore the UWA signal to an approximate original condition, by:

i. estimating the Doppler scale for each packet,
   ii, using the Doppler scale estimations to resample the UWA signal for non-uniform Doppler compensation,
   iii. estimating the carrier frequency offset (CFO) on a block by block basis, and
   iv. using the CFO estimations for high-resolution uniform compensation of residual Doppler effects for inter-carrier interference (ICI) reduction.

In further exemplary embodiments of the present disclosure, the disclosed apparatus/system may include, inter alia, an underwater acoustic (UWA) receiver unit for mitigating Doppler distortions in a received multi-carrier based underwater acoustic (UWA) signal, wherein the unit includes receiving element(s) for receiving a multi-carrier based UWA signal in a distorted condition and a processor for processing the received UWA signal to compensate for the distorted condition and restore the UWA signal to an approximate original condition. The processing may be achieved with programming that is adapted to:

i. estimate the Doppler scale for each packet,
   ii. use the Doppler scale estimations to resample the UWA signal for non-uniform Doppler compensation,
   iii. estimate the carrier frequency offset (CEO) on a block by block basis, and
   iv. use the CFO estimations for high-resolution uniform compensation of residual Doppler effects for inter-carrier interference (ICI) reduction.

In addition, the present disclosure provides an advantageous underwater acoustic (UWA) communications system that may include, inter alia, a transmitter unit, receiving element(s) and a processor in association with receiving element(s). The transmitter unit is generally adapted to transmit a multi-carrier based UWA signal in an original condition and the receiving element(s) are typically adapted to receive the UWA signal in a distorted condition. The processor generally includes programming that is adapted to compensate for the distorted condition and restore the UWA signal to an approximate original condition by:

1. estimating the Doppler scale for each packet, ii, using the Doppler scale estimations to resample the UWA signal for non-uniform Doppler compensation, iii. estimating the carrier frequency offset (CEO) on a block by block basis, and iv. using the CFO estimations for high-resolution uniform compensation of residual Doppler effects for inter-carrier interference (ICI) reduction.

Although the present disclosure has been described with reference to exemplary embodiments and implementations thereof, the disclosed apparatus, systems, and methods are not limited to such exemplary embodiments/implementations. Rather, as will be readily apparent to persons skilled in the art from the description provided herein, the disclosed apparatus, systems and methods are susceptible to modifications, alterations and enhancements without departing from the spirit or scope of the present disclosure. Accordingly, the present disclosure expressly encompasses such modification, alterations and enhancements within the scope hereof.

What is claimed:

1. A method for mitigating Doppler distortions in a received multi-carrier based underwater acoustic (UWA) signal, the method comprising the steps of:
   (a) receiving a multi-carrier based UWA signal in a distorted condition, wherein the multi-carrier based UWA signal includes one or more packets and wherein each of the one or more packets includes one or more data blocks; and
   (b) processing the received multi-carrier based UWA signal to compensate for the distorted condition and restore the multi-carrier based UWA signal to an approximate original condition, wherein processing of the received multi-carrier based UWA signal includes:
      i. estimating the Doppler scale for each packet,
      ii. using the Doppler scale estimations to resample the multi-carrier based UWA signal for non-uniform Doppler compensation,
      iii. estimating the carrier frequency offset (CFO) on a block by block basis to generate a plurality of different CFO estimations, and
      iv. using the plurality of different CFO estimations for high-resolution uniform compensation of residual Doppler effects for inter-carrier interference (ICI) reduction.

2. The method according to claim 1, wherein each of the one or more packets includes a preamble and a postamble, and wherein the Doppler scale for each packet is estimated by synchronizing the preamble and the postamble of that packet.

3. The method according to claim 1, wherein zero-padded orthogonal frequency division multiplexing (ZP-OFDM) of the UWA signal is used to save transmission power on the long guard interval.

4. The method according to claim 3, wherein null subcarriers in the received UWA signal are used to estimate the CFO on a block by block basis to generate the plurality of different CFO estimations.

5. The method according to claim 4, wherein each CFO is estimated using one of: (i) a one dimensional search, (ii) a standard Gradient method, and (iii) a coarse-grid followed by a bisectional search.

6. The method according to claim 4, wherein a two dimensional analysis of the null subcarriers is used to jointly estimate the Doppler scale and the each CFO on a block by block basis.

7. The method according to claim 1, wherein processing of the received UWA signal further includes an initial step of bandpass filtering of the received UWA signal to suppress out-of-band noise.

8. The method according to claim 1, wherein the received signal is converted to baseband before processing.

9. The method according to claim 1, wherein processing of the received UWA signal further includes estimating the channel frequency response for each subcarrier using pilot tones.

10. The method according to claim 1, wherein processing of the received UWA signal further includes Viterbi algorithm (VA) decoding.

11. The method according to claim 1, wherein the multi-carrier based UWA signal is received by multi-channel reception using maximum-ratio-combining (MRC).

12. An underwater acoustic (UWA) receiver unit for mitigating Doppler distortions in a received multi-carrier based underwater acoustic (UWA) signal, the unit comprising:
    (a) at least one receiving element for receiving a multi-carrier based UWA signal in a distorted condition, wherein the multi-carrier based UWA signal includes one or more packets and wherein each of the one or more packets includes one or more data blocks; and
    (b) a processor for processing the received multi-carrier based UWA signal to compensate for the distorted condition and restore the multi-carrier based UWA signal to an approximate original condition, wherein the processor is programmed to:
       i. estimate the Doppler scale for each packet,
       ii. use the Doppler scale estimations to resample the multi-carrier based UWA signal for non-uniform Doppler compensation,
       iii. estimate the carrier frequency offset (CFO) on a block by block basis to generate a plurality of different CFO estimations, and
       iv. use the plurality of different CFO estimations for high-resolution uniform compensation of residual Doppler effects for inter-carrier interference (ICI) reduction.

13. The unit according to claim 12, wherein each of the one or more packets includes a preamble and a postamble, and wherein the Doppler scale for each packet is estimated by synchronizing the preamble and the postamble of that packet.

14. The unit according to claim 12, wherein zero-padded orthogonal frequency division multiplexing (ZP-OFDM) of the UWA signal is used to save transmission power on the long guard interval.

15. The unit according to claim 14, wherein null subcarriers in the received UWA signal are used to estimate the CFO on a block by block basis to generate the plurality of different CFO estimations.

16. The unit according to claim 15, wherein each CFO is estimated using one of: (i) a one dimensional search, (ii) a standard Gradient method, and (iii) a coarse-grid followed by a bisectional search.

17. The unit according to claim 15, wherein a two dimensional analysis of the null subcarriers is used to jointly estimate the Doppler scale and each CFO on a block by block basis.

18. The unit according to claim 12, wherein the processor is programmed to estimate the channel frequency response for each subcarrier using pilot tones in the UWA signal.

19. The unit according to claim 12, wherein the processor is programmed to decode the received UWA signal using Viterbi algorithm (VA) decoding.

20. The unit according to claim 12, wherein the one or more receiving elements are adapted for multi-channel signal reception of the UWA signal.

21. An underwater acoustic (UWA) communications system, comprising:
    (a) a transmitter unit adapted to transmit a multi-carrier based UWA signal in an original condition, the multicarrier based UWA signal including one or more packets and each of the one or more packets including one or more data blocks;

(b) one or more receiving elements adapted to receive the multi-carrier based UWA signal in a distorted condition; and (c) a processor in association with the one or more receiving elements, the processor being programmed to compensate for the distorted condition of the received multi-carrier based UWA signal and to restore the multi-carrier based UWA signal to an approximate original condition by:

i. estimating the Doppler scale for each packet, ii. using the Doppler scale estimations to resample the multi-carrier based UWA signal for non-uniform Doppler compensation, iii. estimating the carrier frequency offset (CFO) on a block by block basis to generate a plurality of different CFO estimations, and iv. using the plurality of different CFO estimations for high-resolution uniform compensation of residual Doppler effects for inter-carrier interference (ICI) reduction.

22. The system according to claim 21, wherein each of the one or more packets includes a preamble and a postamble and wherein the Doppler scale for each packet is estimated by synchronizing the preamble and the postamble of that packet.

23. The system according to claim 21, wherein zero-padded orthogonal frequency division multiplexing (ZP-OFDM) of the UWA signal is used to save transmission power on the long guard interval.

24. The system according to claim 23, wherein null subcarriers in the received UWA signal are used to estimate the CFO on a block by block basis to generate the plurality of different CFO estimations.

25. The system according to claim 21, wherein the processor is programmed to estimate the channel frequency response for each subcarrier using pilot tones in the UWA signal.

26. The system according to claim 21, wherein the processor is programmed to decode the received UWA signal using Viterbi algorithm (VA) decoding.

27. The system according to claim 21, wherein the one or more receiving elements are adapted for multi-channel signal reception of the UWA signal.

* * * * *

UNITED STATES PATENT AND TRADEMARK OFFICE
CERTIFICATE OF CORRECTION

| | | |
|---|---|---|
| PATENT NO. | : 7,859,944 B2 | Page 1 of 1 |
| APPLICATION NO. | : 12/141527 | |
| DATED | : December 28, 2010 | |
| INVENTOR(S) | : Shengli Zhou et al. | |

It is certified that error appears in the above-identified patent and that said Letters Patent is hereby corrected as shown below:

Col. 1, line 18: delete

"STATEMENT OF GOVERNMENT SUPPORT
    The United States government may hold license and/or other rights in this invention as a result of financial support provided by governmental agencies in the development of aspects of the invention. Parts of this work were supported by a grant from the Office of Naval Research, Grant No.: N0014-07-1-0805, and by a grant from the National Science Foundation, Grant No.: BCCS-0725562."

Insert at col. 1, line 18:

--STATEMENT REGARDING FEDERALLY SPONSORED RESEARCH
    This invention was made with government support under Grant No. N00014-07-1-0805 awarded by the Office of Naval Research and under Grant No. ECCS-0725562 awarded by the National Science Foundation. The government has certain rights in the invention.--

Signed and Sealed this
Tenth Day of April, 2012

David J. Kappos
*Director of the United States Patent and Trademark Office*